(12) United States Patent
Hayashi

(10) Patent No.: US 8,159,185 B2
(45) Date of Patent: Apr. 17, 2012

(54) BATTERY CHARGER AND CONTROL METHOD THEREFOR

(75) Inventor: Isao Hayashi, Yokohama (JP)

(73) Assignee: Canon Kabushiki Kaisha (JP)

( * ) Notice: Subject to any disclaimer, the term of this patent is extended or adjusted under 35 U.S.C. 154(b) by 704 days.

(21) Appl. No.: 12/126,031

(22) Filed: May 23, 2008

(65) Prior Publication Data

US 2008/0290839 A1 Nov. 27, 2008

(30) Foreign Application Priority Data

May 23, 2007 (JP) ................................. 2007-137098

(51) Int. Cl.
*H02J 7/00* (2006.01)
(52) U.S. Cl. ......... 320/132; 320/131; 320/133; 320/106
(58) Field of Classification Search .......... 320/130–133, 320/137, 139, 106
See application file for complete search history.

(56) References Cited

U.S. PATENT DOCUMENTS

| | | | |
|---|---|---|---|
| 6,910,143 B2 * | 6/2005 | Odaohhara et al. ........... | 713/340 |
| 7,211,987 B2 | 5/2007 | Aoki | |
| 7,466,105 B2 * | 12/2008 | Inui et al. ...................... | 320/132 |
| 7,492,126 B2 * | 2/2009 | Hogari et al. .................. | 320/132 |
| 2005/0046389 A1 * | 3/2005 | Kim .............................. | 320/132 |

FOREIGN PATENT DOCUMENTS

| | | |
|---|---|---|
| JP | 8-37036 A | 2/1996 |
| JP | 2003-092836 A | 3/2003 |

OTHER PUBLICATIONS

Office Action cited in corresponding Application No. JP2007-137098, dated Nov. 22, 2011.

* cited by examiner

*Primary Examiner* — Samuel Berhanu
(74) *Attorney, Agent, or Firm* — Rossi, Kimms & McDowell LLP

(57) ABSTRACT

A battery charger capable of correcting the deterioration of a secondary battery left unattended in a charge state and capable of accurately grasping a residual capacity. A battery pack having a nonvolatile memory and a secondary battery cell is attached to the battery charger. Full charge capacity data indicating a chargeable capacity of the battery pack at full charge and a left-charged battery deterioration correcting table to correct the full charge capacity data in accordance with the number of charge cycles are read out from the nonvolatile memory. The charged state data is counted each time it is stored in the nonvolatile memory. A battery cycle deterioration correcting value is specified based on the number of charge cycles, and full charge capacity data is corrected using the specified correcting value. The full charge capacity stored in the nonvolatile memory is rewritten.

14 Claims, 35 Drawing Sheets

- IDENTIFICATION DATA
- CHARGE CHARACTERISTIC DATA
- FIRST AND SECOND CHARGE STATE DATA
- CHARGE COUNT DATA
- FULL CHARGE CAPACITY DATA
- TEMPERATURE DATA FOR USE AT CHARGING
- CHARGE TEMPERATURE CHARACTERISTIC DATA
- CHARGE HISTORY DATA
- DISCHARGE CHARACTERISTIC DATA
- BATTERY CYCLE DETERIORATION CORRECTING TABLE
- LEFT-CHARGED BATTERY DETERIORATION CORRECTING TABLE
- DISCHARGE TEMPERATURE VS. LOAD CHARACTERISTIC DATA TABLE

FIG. 12

| FIRST CHARGE STATE DATA | CHARGE VOLTAGE | CHARGE CURRENT | RATIO RELATIVE TO FULL CHARGE CAPACITY |
|---|---|---|---|
| LB STATE | Vb<3.86V | 370mA≦Ichg | 0~5% |
| FIRST STATE | 3.86V≦Vb<3.90V | 370mA≦Ichg | 6~10% |
| SECOND STATE | 3.90V≦Vb<3.94V | 370mA≦Ichg | 11~20% |
| THIRD STATE | 3.94V≦Vb<3.98V | 370mA≦Ichg | 21~30% |
| FOURTH STATE | 3.98V≦Vb<4.00V | 370mA≦Ichg | 31~40% |
| FIFTH STATE | 4.00V≦Vb<4.04V | 370mA≦Ichg | 41~50% |
| SIXTH STATE | 4.04V≦Vb<4.06V | 370mA≦Ichg | 51~60% |
| SEVENTH STATE | 4.06V≦Vb<4.08V | 370mA≦Ichg | 61~70% |
| EIGHTH STATE | 4.08V≦Vb | 370mA≦Ichg | 71~80% |
| NINTH STATE | 4.08V≦Vb | 180mA≦Ichg<370mA | 81~90% |
| TENTH STATE | 4.08V≦Vb | 140mA≦Ichg<180mA | 91~95% |
| FULL STATE | 4.08V≦Vb | Ichg<140mA | 96~100% |

FIG. 13

| FIRST CHARGE STATE DATA | CHARGE VOLTAGE | CHARGE CURRENT | RATIO RELATIVE TO FULL CHARGE CAPACITY |
|---|---|---|---|
| LB STATE | Vb<3.94V | 560mA≦Ichg | 0~5% |
| FIRST STATE | 3.94V≦Vb<3.96V | 560mA≦Ichg | 6~10% |
| SECOND STATE | 3.96V≦Vb<4.00V | 560mA≦Ichg | 11~20% |
| THIRD STATE | 4.00V≦Vb<4.02V | 560mA≦Ichg | 21~30% |
| FOURTH STATE | 4.02V≦Vb<4.06V | 560mA≦Ichg | 31~40% |
| FIFTH STATE | 4.06V≦Vb<4.04V | 560mA≦Ichg | 41~50% |
| SIXTH STATE | 4.08V≦Vb | 450mA≦Ichg<560mA | 51~60% |
| SEVENTH STATE | 4.08V≦Vb | 370mA≦Ichg<450mA | 61~70% |
| EIGHTH STATE | 4.08V≦Vb | 310mA≦Ichg<370mA | 71~80% |
| NINTH STATE | 4.08V≦Vb | 180mA≦Ichg<310mA | 81~90% |
| TENTH STATE | 4.08V≦Vb | 160mA≦Ichg<180mA | 91~95% |
| FULL STATE | 4.08V≦Vb | Ichg<160mA | 96~100% |

FIG. 14

| FIRST CHARGE STATE DATA | CHARGE VOLTAGE | CHARGE CURRENT | RATIO RELATIVE TO FULL CHARGE CAPACITY |
|---|---|---|---|
| LB STATE | Vb<3.64V | 400mA≦Ichg | 0~5% |
| FIRST STATE | 3.64V≦Vb<3.88V | 400mA≦Ichg | 6~10% |
| SECOND STATE | 3.88V≦Vb<3.92V | 400mA≦Ichg | 11~20% |
| THIRD STATE | 3.92V≦Vb<3.94V | 400mA≦Ichg | 21~30% |
| FOURTH STATE | 3.94V≦Vb<3.88V | 400mA≦Ichg | 31~40% |
| FIFTH STATE | 3.98V≦Vb<4.00V | 400mA≦Ichg | 41~50% |
| SIXTH STATE | 4.00V≦Vb<4.04V | 400mA≦Ichg | 51~60% |
| SEVENTH STATE | 4.04V≦Vb<4.06V | 400mA≦Ichg | 61~70% |
| EIGHTH STATE | 4.08V≦Vb | 400mA≦Ichg | 71~80% |
| NINTH STATE | 4.08V≦Vb | 220mA≦Ichg<400mA | 81~90% |
| TENTH STATE | 4.08V≦Vb | 180mA≦Ichg<220mA | 91~95% |
| FULL STATE | 4.08V≦Vb | Ichg<160mA | 96~100% |

FIG. 15

| FIRST CHARGE STATE DATA | SECOND CHARGE STATE DATA | CHARGE VOLTAGE | CHARGE CURRENT | RATIO RELATIVE TO FULL CHARGE CAPACITY | CHARGE CAPACITY [mAh] |
|---|---|---|---|---|---|
| LB STATE | 1 | 2.50V≦Vb<2.772V | 370mA≦Ichg | 1% | 7 |
| | 2 | 2.772V≦Vb<3.044V | | 2% | 14 |
| | 3 | 3.044V≦Vb<3.316V | | 3% | 21 |
| | 4 | 3.316V≦Vb<3.588V | | 4% | 28 |
| | 5 | 3.598V≦Vb<3.860V | | 5% | 35 |
| FIRST STATE | 6 | 3.860V≦Vb<3.868V | 370mA≦Ichg | 6% | 42 |
| | 7 | 3.868V≦Vb<3.876V | | 7% | 49 |
| | 8 | 3.876V≦Vb<3.884V | | 8% | 56 |
| | 9 | 3.884V≦Vb<3.892V | | 9% | 63 |
| | 10 | 3.892V≦Vb<3.900V | | 10% | 70 |
| SECOND STATE | 1 | 3.900V≦Vb<3.904V | 370mA≦Ichg | 11% | 77 |
| | 2 | 3.904V≦Vb<3.908V | | 12% | 84 |
| | 3 | 3.908V≦Vb<3.912V | | 13% | 91 |
| | 4 | 3.912V≦Vb<3.916V | | 14% | 98 |
| | 5 | 3.916V≦Vb<3.920V | | 15% | 105 |
| | 6 | 3.920V≦Vb<3.924V | | 16% | 112 |
| | 7 | 3.924V≦Vb<3.928V | | 17% | 119 |
| | 8 | 3.928V≦Vb<3.932V | | 18% | 126 |
| | 9 | 3.932V≦Vb<3.936V | | 19% | 133 |
| | 10 | 3.936V≦Vb<3.940V | | 20% | 140 |
| THIRD TO NINTH STATES | ⋮ | 3.983≦Vb<3.940V | ⋮ | 21~90% | 140~630 |
| TENTH STATE | 1 | 4.08V≦Vb | 172mA≦Ichg<180mA | 91% | 637 |
| | 2 | | 164mA≦Ichg<172mA | 92% | 644 |
| | 3 | | 156mA≦Ichg<164mA | 93% | 651 |
| | 4 | | 148mA≦Ichg<158mA | 94% | 658 |
| | 5 | | 140mA≦Ichg<146mA | 95% | 665 |
| FULL STATE | 6 | 4.08V≦Vb | 130mA≦Ichg<140mA | 96% | 672 |
| | 7 | | 120mA≦Ichg<130mA | 97% | 679 |
| | 8 | | 110mA≦Ichg<120mA | 98% | 686 |
| | 9 | | 100mA≦Ichg<110mA | 99% | 693 |
| | 10 | | Ichg<100mA | 100% | 700 |

FIG. 18

| FIRST CHARGE STATE DATA | CHARGE MEASUREMENT RESULT | LEFT-CHARGED BATTERY DETERIORATION CORRECTING VALUE [mAh] |
|---|---|---|
| FULL STATE | FULL STATE | 0 |
| | TENTH STATE | 0 |
| | NINTH STATE | 1 |
| | EIGHTH STATE | 2 |
| | SEVENTH STATE | 3 |
| | SIXTH STATE | 4 |
| | FIFTH STATE | 5 |
| | FOURTH STATE | 6 |
| | THIRD STATE | 7 |
| | SECOND STATE | 8 |
| | FIRST STATE | 9 |
| | LB STATE | 10 |
| TENTH STATE | FULL STATE | 0 |
| | TENTH STATE | 0 |
| | NINTH STATE | 0 |
| | EIGHTH STATE | 0.5 |
| | SEVENTH STATE | 1 |
| | SIXTH STATE | 1.5 |
| | FIFTH STATE | 2 |
| | FOURTH STATE | 2.5 |
| | THIRD STATE | 3 |
| | SECOND STATE | 3.5 |
| | FIRST STATE | 4 |
| | LB STATE | 4.5 |
| NINTH STATE AND OTHERS | ⋮ | ⋮ |

*FIG. 19*

| NUMBER OF CHARGE CYCLES | BATTERY CYCLE DETERIORATION CORRECTING VALUE [mAh] |
|---|---|
| 1~50 | 0.42 |
| 51~100 | 0.7 |
| 101~150 | 0.98 |

FIG. 30

| FIRST CHARGE STATE DATA | OUTPUT VOLTAGE (AT 1 W DISCHARGE) | RATIO RELATIVE TO FULL CHARGE CAPACITY (AT 1 W DISCHARGE) | RESIDUAL CAPACITY [mAh] |
|---|---|---|---|
| LB STATE | Vb<3.18V | 0~5% | 0~33.25 |
| FIRST STATE | 3.18V≦Vb<3.26V | 6~10% | 39.9~66.5 |
| SECOND STATE | 3.26V≦Vb<3.36V | 11~20% | 73.15~133 |
| THIRD STATE | 3.36V≦Vb<3.44V | 21~30% | 139.65~109.5 |
| FOURTH STATE | 3.44V≦Vb<3.50V | 31~40% | 206.15~268 |
| FIFTH STATE | 3.50V≦Vb<3.54V | 41~50% | 272.65~332.5 |
| SIXTH STATE | 3.54V≦Vb<3.60V | 51~60% | 339.15~399 |
| SEVENTH STATE | 3.60V≦Vb<3.66V | 61~70% | 405.65~465.5 |
| EIGHTH STATE | 3.66V≦Vb<3.70V | 71~80% | 472.15~532 |
| NINTH STATE | 3.70V≦Vb<3.80V | 81~90% | 538.65~598.5 |
| TENTH STATE | 3.80V≦Vb<3.98V | 91~95% | 605.15~631.75 |
| FULL STATE | 3.98V≦Vb | 96~100% | 638.4~665 |

FIG. 31

| FIRST CHARGE STATE DATA | OUTPUT VOLTAGE (AT 1 W DISCHARGE) | RATIO RELATIVE TO FULL CHARGE CAPACITY (AT 1 W DISCHARGE) | RESIDUAL CAPACITY [mAh] |
|---|---|---|---|
| LB STATE | Vb<3.18V | 0~5% | 0~31.5 |
| FIRST STATE | 3.18V≦Vb<3.26V | 6~10% | 37.8~63 |
| SECOND STATE | 3.26V≦Vb<3.36V | 11~20% | 69.3~126 |
| THIRD STATE | 3.36V≦Vb<3.44V | 21~30% | 132.3~189 |
| FOURTH STATE | 3.44V≦Vb<3.50V | 31~40% | 185.3~252 |
| FIFTH STATE | 3.50V≦Vb<3.54V | 41~50% | 258.3~315 |
| SIXTH STATE | 3.54V≦Vb<3.60V | 51~60% | 321.3~378 |
| SEVENTH STATE | 3.60V≦Vb<3.65V | 61~70% | 384.3~441 |
| EIGHTH STATE | 3.65V≦Vb<3.68V | 71~80% | 447.3~504 |
| NINTH STATE | 3.68V≦Vb<3.75V | 81~90% | 510.3~567 |
| TENTH STATE | 3.75V≦Vb<3.90V | 91~95% | 578.3~598.5 |
| FULL STATE | 3.90V≦Vb | 96~100% | 604.8~630 |

FIG. 32

| FIRST CHARGE STATE DATA | OUTPUT VOLTAGE (AT 1 W DISCHARGE) | RATIO RELATIVE TO FULL CHARGE CAPACITY (AT 1 W DISCHARGE) | RESIDUAL CAPACITY [mAh] |
|---|---|---|---|
| LB STATE | Vb<3.18V | 0~5% | 0~33.6 |
| FIRST STATE | 3.18V≦Vb<3.27V | 6~10% | 40.32~67.2 |
| SECOND STATE | 3.27V≦Vb<3.37V | 11~20% | 73.92~134.4 |
| THIRD STATE | 3.37V≦Vb<3.46V | 21~30% | 141.12~201.6 |
| FOURTH STATE | 3.46V≦Vb<3.52V | 31~40% | 208.32~268.8 |
| FIFTH STATE | 3.52V≦Vb<3.57V | 41~50% | 275.52~336 |
| SIXTH STATE | 3.57V≦Vb<3.63V | 51~60% | 342.72~403.2 |
| SEVENTH STATE | 3.63V≦Vb<3.70V | 61~70% | 409.92~470.4 |
| EIGHTH STATE | 3.70V≦Vb<3.74V | 71~80% | 477.12~537.6 |
| NINTH STATE | 3.74V≦Vb<3.85V | 81~90% | 544.32~604.8 |
| TENTH STATE | 3.85V≦Vb<4.03V | 91~95% | 611.52~638.4 |
| FULL STATE | 4.03V≦Vb | 96~100% | 645.12~672 |

FIG. 33A

| FIRST CHARGE STATE DATA | SECOND CHARGE STATE DATA | OUTPUT VOLTAGE (AT 1 W DISCHARGE) | RATIO RELATIVE TO FULL CHARGE CAPACITY (AT 1 W DISCHARGE) | RESIDUAL CAPACITY [mAh] |
|---|---|---|---|---|
| LB STATE | 1 | 3.100V≦Vb<3.116V | 1% | 6.65 |
| | 2 | 3.116V≦Vb<3.132V | 2% | 13.3 |
| | 3 | 3.132V≦Vb<3.148V | 3% | 19.95 |
| | 4 | 3.148V≦Vb<3.164V | 4% | 26.6 |
| | 5 | 3.164V≦Vb<3.180V | 5% | 33.25 |
| | 6 | 3.180V≦Vb<3.196V | 6% | 39.9 |
| | 7 | 3.186V≦Vb<3.212V | 7% | 46.55 |
| | 8 | 3.212V≦Vb<3.228V | 8% | 56.2 |
| | 9 | 3.228V≦Vb<3.244V | 9% | 59.85 |
| | 10 | 3.244V≦Vb<3.260V | 10% | 66.5 |
| FIRST STATE | 1 | 3.260V≦Vb<3.270V | 11% | 73.15 |
| | 2 | 3.270V≦Vb<3.280V | 12% | 79.8 |
| | 3 | 3.280V≦Vb<3.290V | 13% | 86.45 |
| | 4 | 3.290V≦Vb<3.300V | 14% | 93.1 |
| | 5 | 3.300V≦Vb<3.310V | 15% | 99.75 |
| SECOND STATE | 6 | 3.310V≦Vb<3.320V | 16% | 106.4 |
| | 7 | 3.320V≦Vb<3.330V | 17% | 113.05 |
| | 8 | 3.330V≦Vb<3.340V | 18% | 119.7 |
| | 9 | 3.340V≦Vb<3.350V | 19% | 126.35 |
| | 10 | 3.350V≦Vb<3.360V | 20% | 133 |

FIG. 33B

| | | 3.360≤Vb<3.800V | 21~90% | 139.65~598.5 |
|---|---|---|---|---|
| THIRD TO NINTH STATES | ...... | | | |
| TENTH STATE | 1 | 3.800V≤Vb<3.836V | 91% | 605.15 |
| | 2 | 3.836V≤Vb<3.872V | 92% | 611.8 |
| | 3 | 3.872V≤Vb<3.906V | 93% | 618.45 |
| | 4 | 3.903V≤Vb<3.944V | 94% | 625.1 |
| | 5 | 3.944V≤Vb<3.980V | 95% | 631.75 |
| | 6 | 3.980V≤Vb<3.994V | 96% | 638.4 |
| | 7 | 3.994V≤Vb<4.008V | 97% | 645.65 |
| | 8 | 4.008V≤Vb<4.022V | 98% | 651.7 |
| | 9 | 4.022V≤Vb<4.036V | 99% | 658.35 |
| FULL STATE | 10 | 4.036V≤Vb | 100% | 665 |

FIG. 36

| CHARGE TEMPERATURE CHARACTERISTIC | | FULL CHARGE CAPACITY EFFICIENCY (RATIO RELATIVE TO CHARGE EFFICIENCY AT 25 DEGREES C) |
|---|---|---|
| TEMPERATURE AT CHARGING | 5°C | 0.92 |
| | 35°C | 1.02 |

FIG. 37

| OPERATION MODE | POWER CONSUMPTION |
|---|---|
| REC | 2W |
| PLAY | 1W |
| ⋮ | ⋮ |

FIG. 38

| OPERATION MODE | ACTUAL USABLE TIME COEFFICIENT |
|---|---|
| REC | 0.6 |
| PLAY | 0.8 |
| ⋮ | ⋮ |

FIG. 39

| DISCHARGE TEMPERATURE VS. LOAD CHARACTERISTIC | | DISCHARGE EFFICIENCY (RATIO RELATIVE TO EFFICIENCY AT 0.5 W DISCHARGE AT 25 DEGREES C) | |
|---|---|---|---|
| | | 1W | 2W |
| TEMPERATURE AT DISCHARGING | 5°C | 0.9 | 0.8 |
| | 25°C | 0.95 | 0.93 |
| | 35°C | 0.96 | 0.94 |

BATTERY CHARGER AND CONTROL METHOD THEREFOR

BACKGROUND OF THE INVENTION

1. Field of the Invention

The present invention relates to a battery charger for charging a battery pack having a memory and a secondary battery, and relates to a control method therefor.

2. Description of the Related Art

In a conventional deterioration management of a battery pack having a memory function and a residual capacity indication function, a change in the output voltage of a power source (secondary battery) is detected inside the battery pack, and the number of times the battery pack has been used and the number of times the battery pack has been charged and discharged are counted for storage in a memory (see, for example, Japanese Laid-open Patent Publication No. 08-037036).

In the above-described prior art, a change in the secondary battery voltage is measured inside the battery pack. Therefore, voltage measurement means must be provided inside the battery pack. In addition, a microcomputer must be provided. With this arrangement, the battery pack is complicate in its internal circuit, which increases the cost of the battery pack. Furthermore, a deterioration of the secondary battery occurs, if the battery pack is left unattended. Nevertheless, no countermeasure is taken against the battery deterioration of the secondary battery left unattended in a charged state, which poses a problem. Another problem is that no countermeasure is taken against the battery deterioration due to repeated charge cycles of the battery pack.

SUMMARY OF THE INVENTION

The present invention provides a battery charger capable of correcting the deterioration of a secondary battery caused when the battery is left unattended in a charged state or subjected to repeated charge cycles, and capable of grasping a residual capacity state of the battery more accurately, and provides a control method of the battery charger.

According to a first aspect of this invention, there is provided a battery charger in which charge state data stored in a memory of a battery pack attached to the battery charger and representing a charge state of the battery pack is rewritten in accordance with at least one of a charge current and a charge voltage applied to the battery pack, comprising a counting unit adapted to count number of times the charge state data has been rewritten, a charge cycle calculating unit adapted to calculate number of charge cycles based on the counted number of times the charge state data has been rewritten, a full charge capacity data correcting unit adapted to correct full charge capacity data based on the calculated number of charge cycles, and a writing unit adapted to write the corrected full charge capacity data into the memory of the battery pack.

According to a second aspect of this invention, there is provided a battery charger in which charge state data stored in a memory of a battery pack attached to the battery charger and representing a charge state of the battery pack is rewritten in accordance with at least one of a charge current and a charge voltage applied to the battery pack, comprising a determining unit adapted to read out the charge state data stored in the memory of the battery pack and determine whether or not the read out charge state data coincides with current charge state data, a full charge capacity data correcting unit adapted to correct full charge capacity data in accordance with a difference between the read out charge state data and the current charge state data when it is determined by the determining unit that the read out charge state data does not coincide with the current charge state data, and a writing unit adapted to write the corrected full charge capacity data into the memory of the battery pack.

According to a third aspect of this invention, there is provided a control method for a battery charger in which charge state data stored in a memory of a battery pack attached to the battery charger and representing a charge state of the battery pack is rewritten in accordance with at least one of a charge current and a charge voltage applied to the battery pack, comprising the steps of (a) counting number of times the charge state data has been rewritten, (b) calculating number of charge cycles based on the number of times the charge state data has been rewritten counted in the step (a), (c) correcting full charge capacity data based on the number of charge cycles calculated in the step (b), and (d) writing the full charge capacity data corrected in the step (c) into the memory of the battery pack.

According to a fourth aspect of this invention, there is provided a control method for a battery charger in which charge state data stored in a memory of a battery pack attached to the battery charger and representing a charge state of the battery pack is rewritten in accordance with at least one of a charge current and a charge voltage applied to the battery pack, comprising the steps of (a) reading out the charge state data stored in the memory of the battery pack, (b) determining whether or not the charge state data read out in the step (a) coincides with current charge state data, (c) correcting full charge capacity data in accordance with a difference between the charge state data read out in the step (b) and the current charge state data when it is determined in the step (b) that the read out charge state data does not coincide with the current charge state data, and (d) writing the full charge capacity data corrected in the step (c) into the memory of the battery pack.

According to this invention, it is possible to correct the deterioration of the secondary battery caused when the battery is left unattended in a charged state or subjected to repeated charge cycles and to grasp a residual capacity state of the battery more accurately.

Further features of the present invention will become apparent from the following description of an exemplary embodiment with reference to the attached drawings.

BRIEF DESCRIPTION OF THE DRAWINGS

FIG. 2 is a view showing various data and table information stored in a nonvolatile memory of the battery pack;

FIG. 12 is a view showing an example of a charge state data table corresponding to first charge state data and used at the time of charging at a temperature of 25 degrees Celsius;

FIG. 13 is a view showing an example of a charge state data table for use at the time of charging at a temperature of 5 degrees Celsius;

FIG. 14 is a view showing an example of a charge state data table for use at the time of charging at a temperature of 35 degrees Celsius;

FIG. 15 is a view showing an example of a charge state data table corresponding to first and second charge state data and used at the time of charging;

FIG. 18 is a view showing an example of a left-charged battery deterioration correcting table;

FIG. 19 is a view showing an example of a battery cycle deterioration correcting table;

FIG. 30 is a view showing an example of a charge state data table corresponding to the first charge state data and used at the time of discharging at a temperature of 25 degrees Celsius;

FIG. 31 is a view showing an example of a charge state data table for use at discharging at a temperature of 5 degrees Celsius;

FIG. 32 is a view showing an example of a charge state data table for use at discharging at a temperature of 35 degrees Celsius;

FIGS. 33A and 33B are a view showing an example of a charge state data table corresponding to first and second charge state data and used at the time of discharging;

FIG. 36 is a view showing an example of charge temperature characteristic data;

FIG. 37 is a view showing an example of a power consumption data table;

FIG. 38 is a view showing an example of an actual usable time coefficient data table; and FIG. 39 is a view showing an example of a discharge temperature vs. load characteristic data table.

DETAILED DESCRIPTION OF THE PREFERRED EMBODIMENT

The present invention will now be described in detail below with reference to the drawings showing a preferred embodiment thereof.

Figure 1:
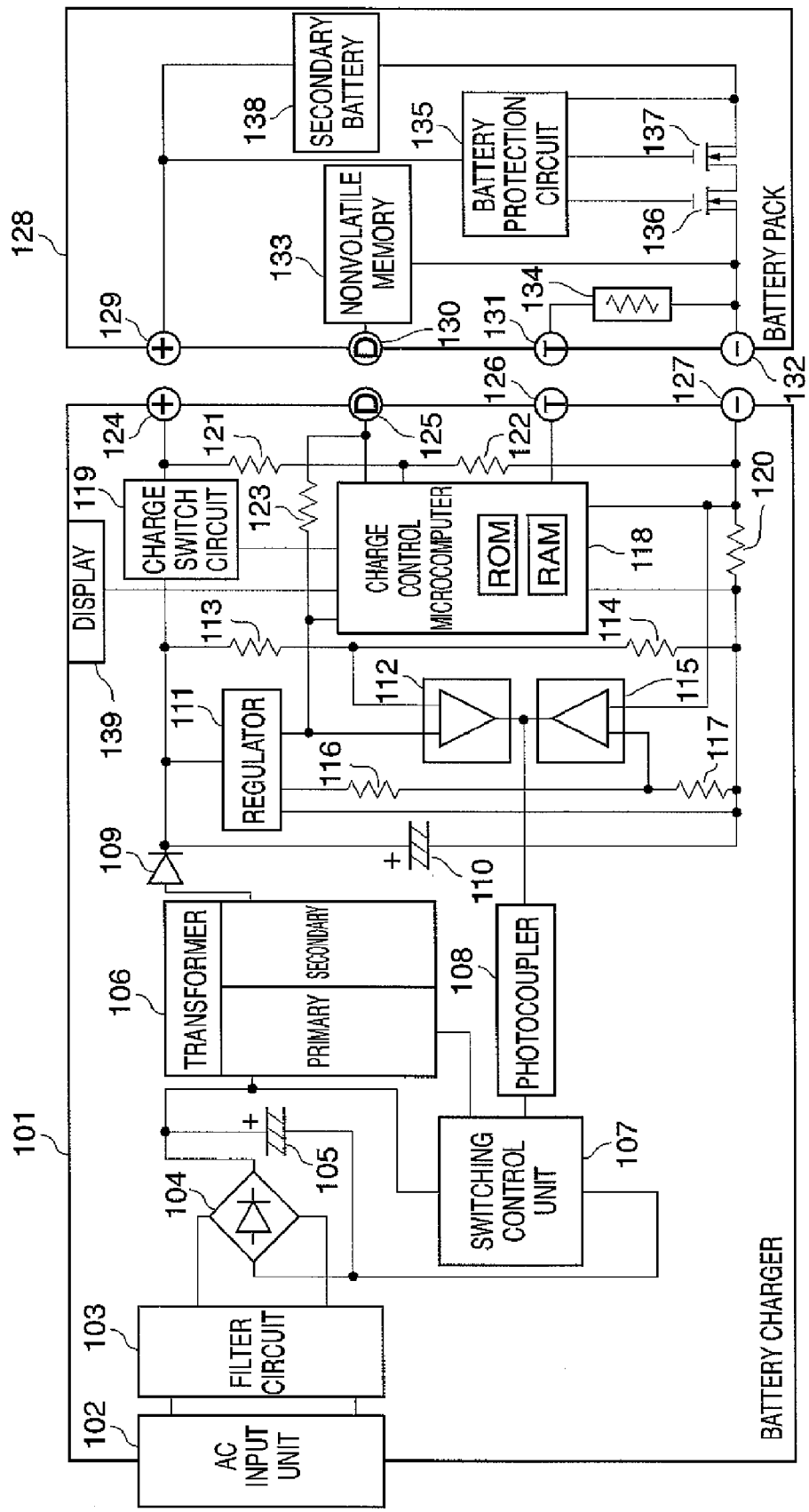
FIG. 1 is a block diagram showing the internal construction of a battery charger and a battery pack according to one embodiment of this invention.

FIG. 1 shows in a block diagram the internal construction of a battery charger and a battery pack according to one embodiment of this invention.

In FIG. 1, there is shown a battery charger 101 for charging a battery pack 128 adapted to be removably attached to the battery charger 101 and including a secondary battery that can be repeatedly charged. The battery pack 128 is attached to electronic equipment such as a digital camera or a PDA (personal digital assistant) described later, and functions as a power source of the electronic equipment.

In the battery charger 101, an AC input unit 102 is adapted to be connected to an external AC (alternating current) power source for being supplied with AC. A filter circuit 103 reduces noise contained in the AC supplied from the AC input unit 102. A bridge diode 104 half-wave rectifies the AC. A primary electrolytic capacitor 105 converts the half-wave rectified AC into a DC (direct current). A transformer 106 transforms the DC. A switching control unit 107 stabilizes a secondary output of the transformer 106 in accordance with a signal supplied from a photocoupler 108. The photocoupler 108 transmits a signal representative of a charge voltage/charge current state on the secondary side of the transformer 106 to the primary side thereof. A rectifier diode 109 and a rectifier capacitor 110 rectify an output of the transformer 106.

A regulator 111 supplies a predetermined DC to a charge control microcomputer 118, and supplies a reference voltage to operational amplifiers 112, 115. The operational amplifier 112 feeds back the charge voltage of the battery pack 128. The operational amplifier 115 feeds back the charge current of the battery pack 128. Resistors 113, 114 are provided to feed back the charge voltage of the battery pack 128. Resistors 116, 117 are provided to set a predetermined charge current.

The charge control microcomputer 118 is a control circuit including a nonvolatile RAM (random access memory) and a ROM (read only memory). The charge control microcomputer 118 is capable of measuring the charge voltage and the charge current applied from the battery charger 101 to the battery pack 128 and measuring the temperature of a secondary battery cell 138 by means of a thermistor 134 disposed in the battery pack 128. The microcomputer 118 reads out data and table information shown in FIG. 2 from a nonvolatile memory 133 in the battery pack 128, and based thereon determines a charge state of the battery pack 128. Furthermore, the charge control microcomputer 118 accesses the nonvolatile memory 133 in the battery pack 128 to write various data into the memory 133 and to renew data therein.

A charge switch circuit 119 is for turning on/off a charge output. A current detection resistor 120 is for use by the charge control microcomputer 118 in the charge current measurement. Resistors 121, 122 are for use by the charge control microcomputer 118 in the charge voltage measurement. A predetermined voltage is applied via a resistor 123 to the nonvolatile memory 133. A display 139 comprised of a plurality of LEDs is adapted to indicate a charge state of the battery pack 128 by lighting or blinking these LEDs.

When the battery pack 128 is attached to the battery charger 101, a positive terminal 124 is made in contact with a positive terminal 129 of the battery pack and is electrically connected therewith. When the battery pack 128 is attached to the battery charger 101, a communication (D) terminal 125 is made in contact with a communication (D) terminal 130 of the battery pack for electrical connection therewith. When the battery pack 128 is attached to the battery charger 101, a temperature (T) terminal 126 is made in contact with a temperature (T) terminal 131 of the battery pack for electrical connection therewith. When the battery pack 128 is attached to the battery charger 101, a negative terminal 127 is made in contact with a negative terminal 132 of the battery pack for electrical connection therewith.

The thermistor 134 is a temperature measuring element for converting a temperature change into a resistance value. The charge control microcomputer 118 is able to measure the temperature of the secondary battery cell 138 based on the voltage across the thermistor 134 supplied via the temperature (T) terminals 126, 131, which are connected together. A battery protection circuit 135 monitors the current/voltage at the time of charging and discharging the battery pack 128, and protects the secondary battery cell 138 from being overcharged or over-discharged. A charge protection FET 136 is a switch for shutting off the circuit upon occurrence of an abnormality at charging, and is controlled by the battery protection circuit 135. A discharge protection FET 137 is a switch for shutting off the circuit upon occurrence of an abnormality at discharging, and is controlled by the battery protection circuit 135. The secondary battery cell 138 is comprised of a lithium ion secondary battery or the like.

When supplied with AC, the AC input unit 102 supplies electric power to the transformer 106 via the filter circuit 103, the bridge diode 104, and the primary electrolytic capacitor 105. A secondary output voltage of the transformer 106 is rectified by the rectifier diode 109 and the rectifier capacitor 110 for being set as the charge voltage of the battery pack 128 via the resistors 113, 114, the operational amplifier 112, and the photocoupler 108.

When the battery pack 128 is attached to the battery charger 101, the positive terminal 124 of the battery charger 101 is connected to the positive terminal 129 of the battery pack 128, and the negative terminal 127 of the battery charger 101 is connected to the negative terminal 132 of the battery pack 128. At the same time, the communication (D) terminal 125 of the battery charger 101 is connected to the communication (D) terminal 130 of the battery pack 128, and the temperature (T) terminal 126 of the battery charger 101 is connected to the temperature (T) terminal 131 of the battery pack 128. A charge current is set by the resistors 116, 117. Constant voltage/current charge is carried out via the current detection resistor 120, the operational amplifier 115, and the photocoupler 108.

The charging of the battery pack 128 is controlled by the charge control microcomputer 118. The charge control microcomputer 118 measures the charge current based on a potential difference across the both ends of the current detection resistor 120, measures the charge voltage by means of the resistors 121, 122, and measures an increase in the charge voltage and a decrease in the charge current.

FIG. 2 shows various data and table information stored in the nonvolatile memory 133 of the battery pack 128.

Pieces of information are stored in advance in the nonvolatile memory 133, which include identification data, charge characteristic data, first and second charge state data, charge count data, full charge capacity data, temperature data at charging, charge temperature characteristic data, charge history data, discharge characteristic data, and a table for correcting the battery deterioration due to repeated charge cycles (hereinafter referred to as the "battery cycle deterioration correcting table"). Furthermore, a table for correcting the deterioration of a battery left unattended in a charged state (hereinafter referred to as the "the left-charged battery deterioration correcting table"), and a discharge temperature vs. load characteristic data table are stored in advance in the nonvolatile memory 133. Among these, the identification data, the charge characteristic data, the discharge characteristic data, the charge temperature characteristic data, the battery cycle deterioration correcting table, and the left-charged battery deterioration correcting table each consist of fixed values.

The identification data is for representing a type of the battery pack 128 and is unique for each battery pack type. The charge characteristic data is for use in the preparation of a charge state data table for use at charging, described later, in which one or more numerical data of temperature at charging, charge voltage, charge current, full charge capacity ratio, and charge capacity are selectively contained.

The first and second charge state data are for representing a charge state of the battery pack 128. The charge count data, which is counted each time the first charge state data is rewritten, is for use in the management of the charge cycle of the battery pack 128. In this embodiment, one cycle is counted each time the first charge state data is rewritten twelve times or each time the second charge state data is rewritten one hundred times.

The full charge capacity data is for indicating a chargeable capacity of the battery pack 128 at full charge. The temperature data at charging is temperature information at charging. The charge temperature characteristic data is used for correcting the full charge capacity at the temperature at charging.

The charge history data is a data flag that indicates a charge history of the battery pack 128. When the battery pack 128 is charged by the battery charger 101, the charge history data is set to a value of "1". When the battery pack 128 is attached to the electronic equipment 301 for use as a power source thereof, the charge history data is set to a value of "0". The discharge characteristic data is for use in the preparation of a charge state data table for use at discharging, described later, in which one or more numerical data of temperature at discharging, output voltage, discharge load, full charge capacity ratio, and residual capacity are selectively contained.

As shown in FIG. 19, the battery cycle deterioration correcting table is used for correcting the full charge capacity data in accordance with the number of charge cycles. As shown in FIG. 18, the left-charged battery deterioration correcting table is used for correcting the full charge capacity data in accordance with one of predetermined charged states in which the battery pack has been left unattended. The discharge temperature vs. load characteristic data table is used for correcting the amount of power consumption in accordance with the temperature at discharging. As shown in FIG. 39, in the discharge temperature vs. load characteristic data table, correction values for correcting the amount of power consumption are defined in accordance with a relation between temperature at discharging and discharge efficiency. In the data table, each of discharge efficiencies is represented by a ratio relative to the discharge efficiency, which is assumed to have a value of "1", of a 0.5 W discharge at a temperature of 25 degrees Celsius.

Next, a process for charging the battery pack 128 by the battery charger 101 will be described with reference to FIGS. 3 to 20.

Figure 3:
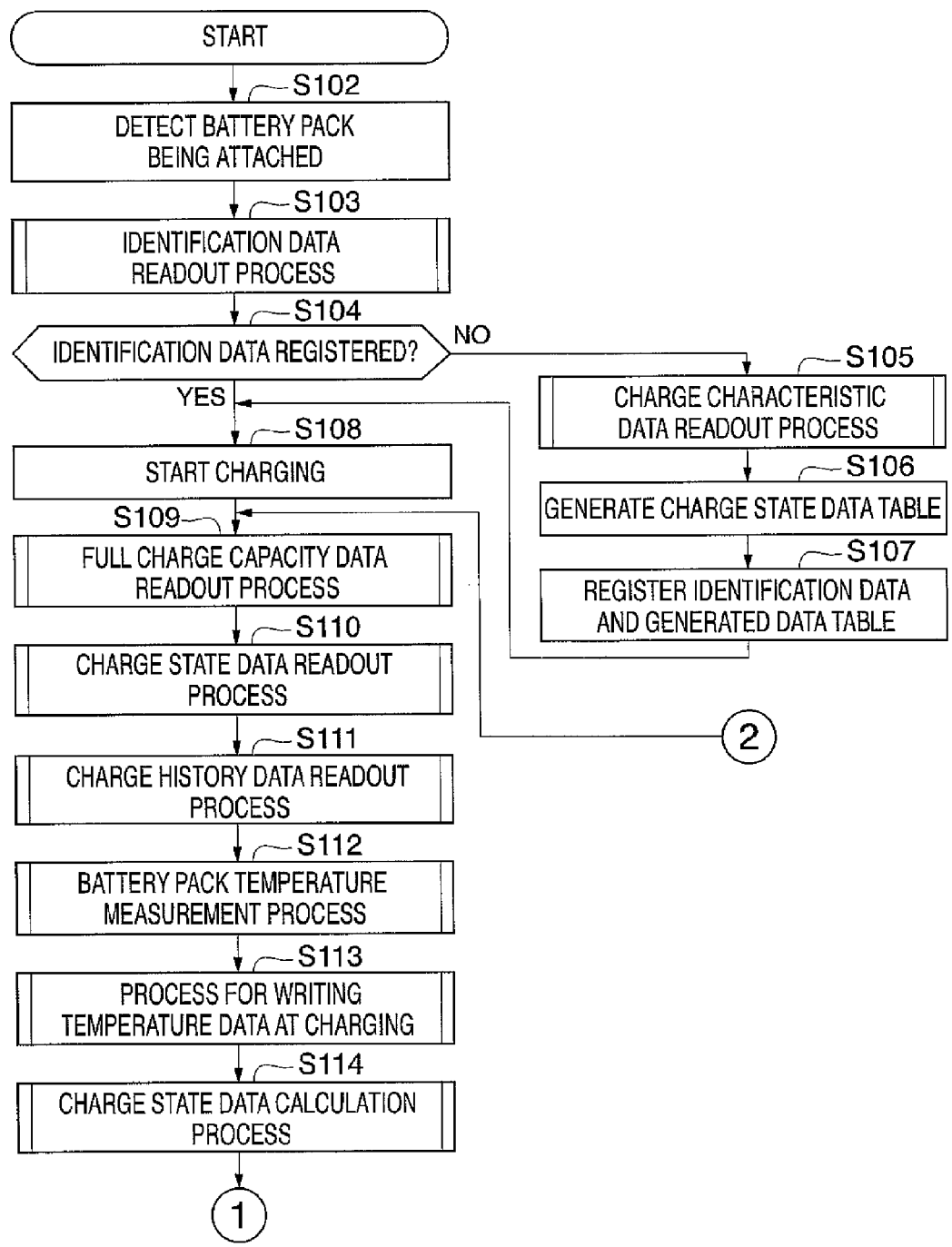
FIG. 3 is a flowchart showing a part of a battery pack charging process performed by the battery charger.
Figure 4:
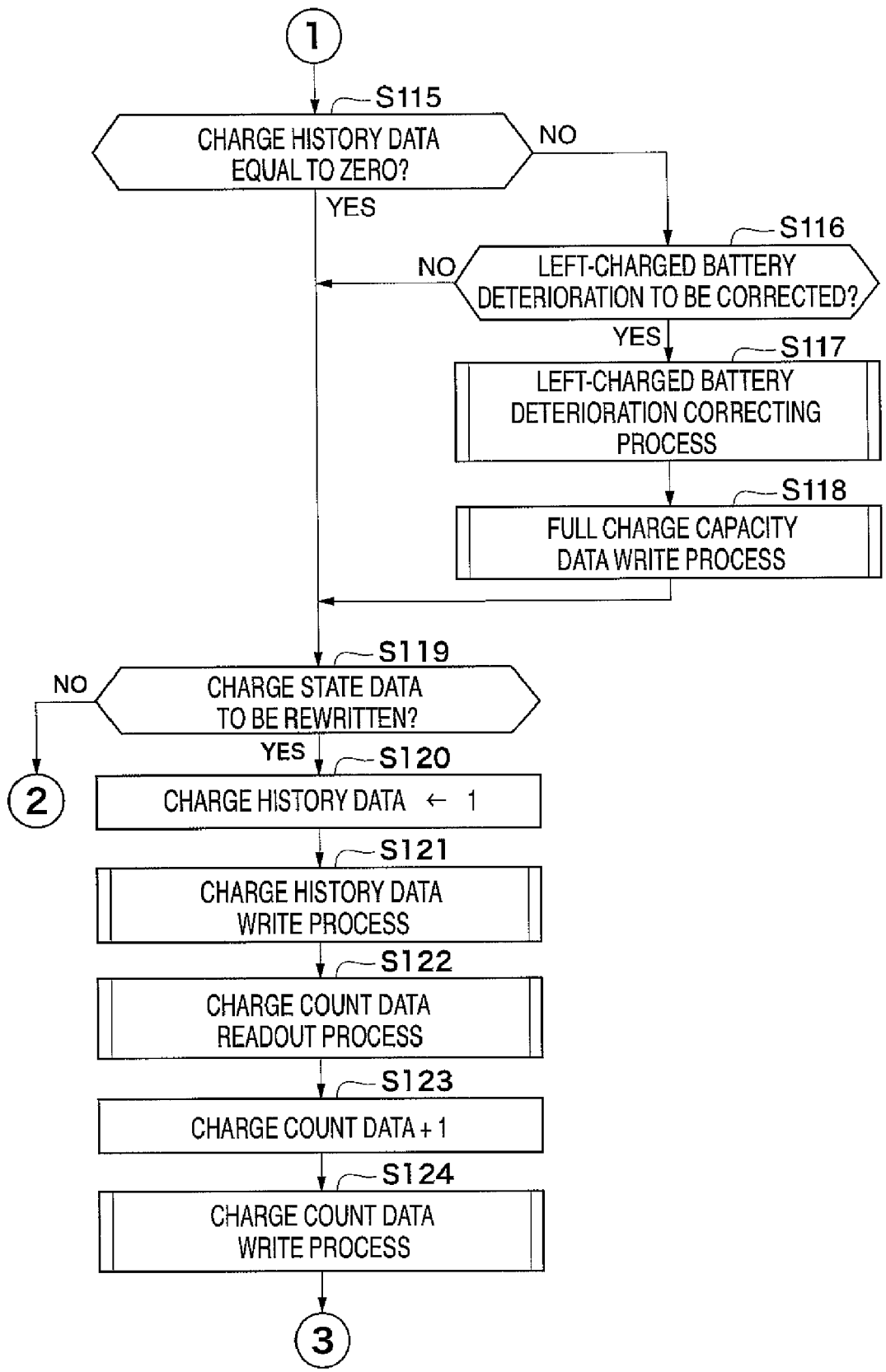
FIG. 4 is a flowchart showing another part of the charging process that follows the flowchart of FIG. 3.
Figure 5:
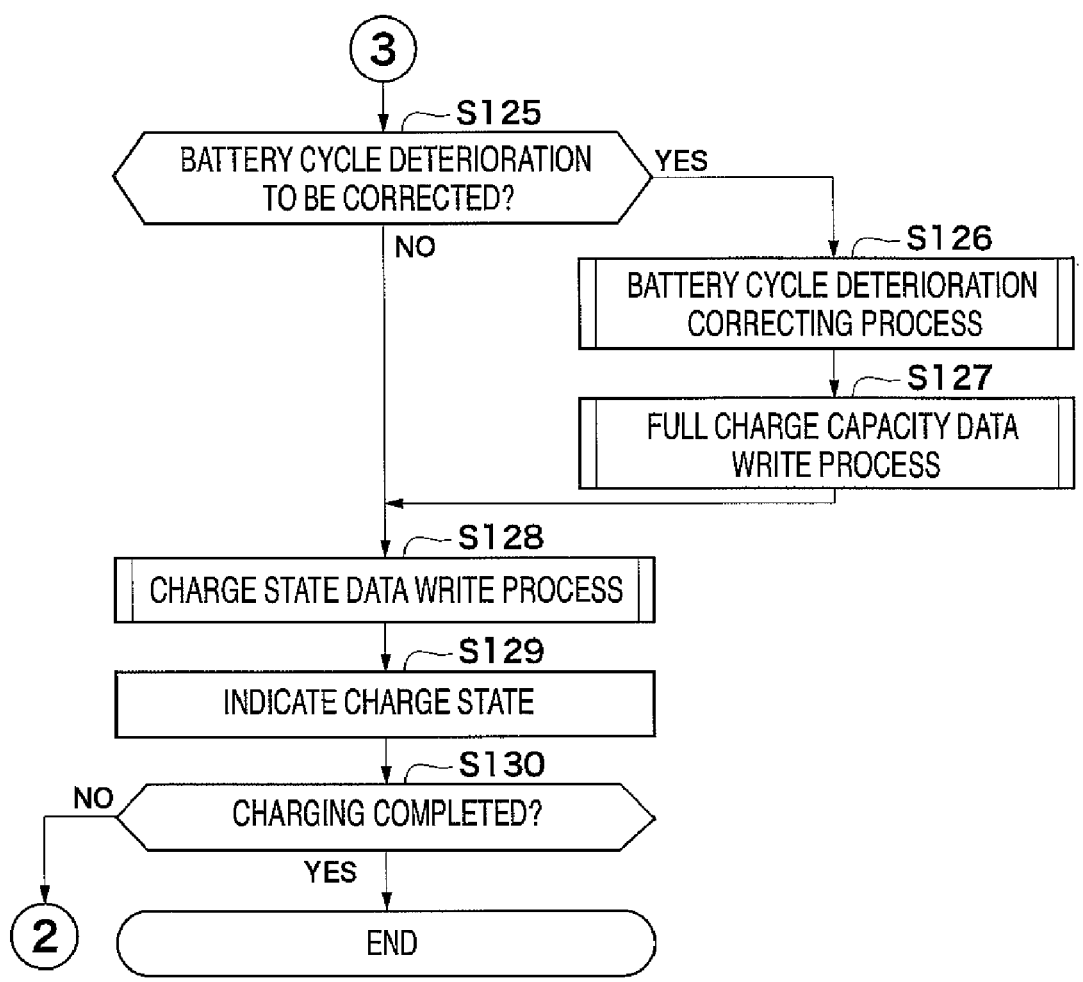
FIG. 5 is a flowchart showing the remaining part of the charging process that follows the flowchart of FIG. 4.

FIGS. 3 to 5 show in flowchart a process for charging the battery pack 128 by the battery charger 101.

In FIG. 3, when detecting that the battery pack 128 is attached to the batter charger 101 (step S102), the charge control microcomputer 118 reads out identification data from the nonvolatile memory 133 of the battery pack 128 via the communication terminals 125, 130 (step S103). To read out the identification data from the nonvolatile memory 133, a data readout process in FIG. 6 is carried out.

Figure 6:
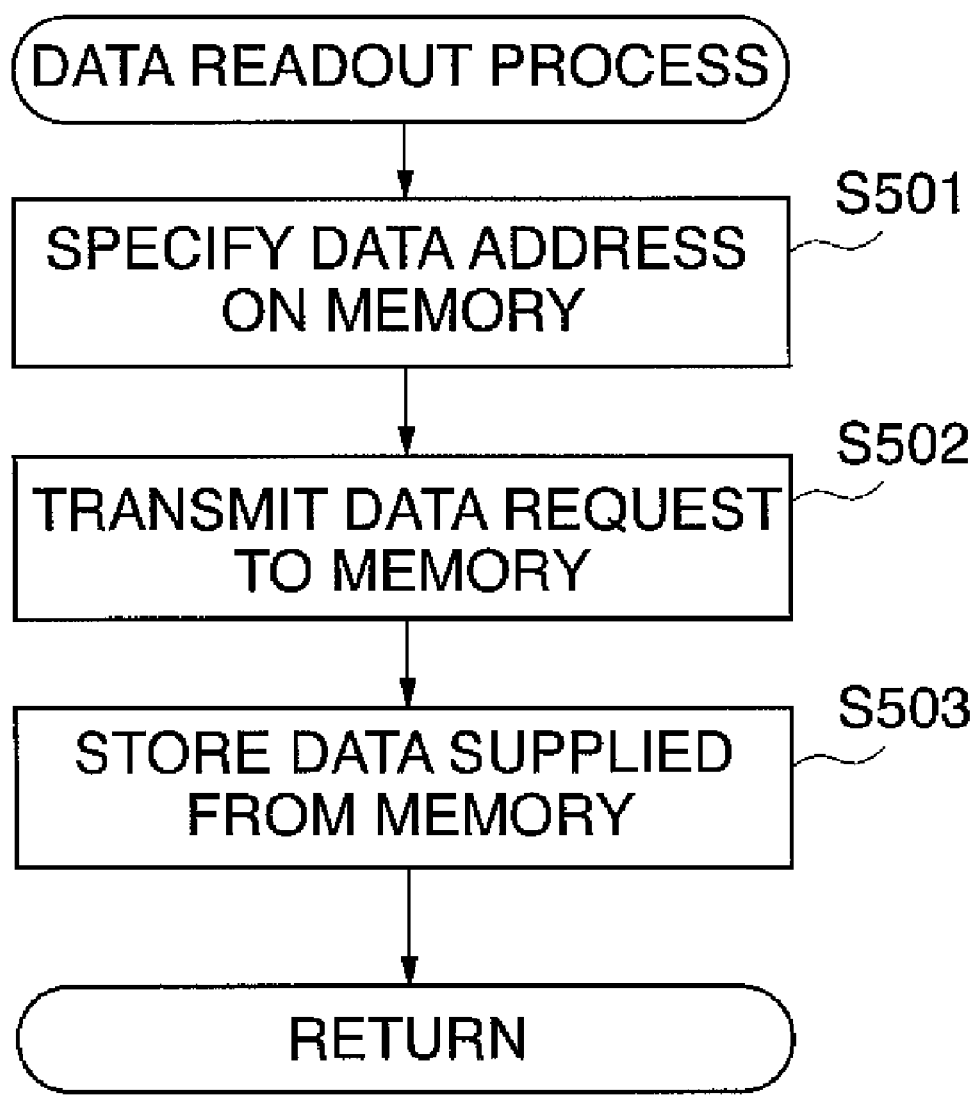
FIG. 6 is a flowchart showing a data readout process for reading out data from the nonvolatile memory of the battery pack.

Referring to FIG. 6, in step S501, the charge control microcomputer 118 specifies a data address on the nonvolatile memory 133. In step S103 in FIG. 3, a data address on the nonvolatile memory 133 in which the identification data is stored is specified. Next, in step S502, a data request is transmitted to the nonvolatile memory 133. In step S503, return data responsive to the transmitted data request is stored in the RAM of the charge control microcomputer 118, whereupon the flow returns to the main flow. In step S103 in FIG. 3, the identification data corresponding to the return data is stored into the RAM of the charge control microcomputer 118.

In step S104 in FIG. 3, the charge control microcomputer 118 determines whether or not the identification data read out in step S103 is stored (registered) in the ROM of the microcomputer 118. If it is determined that the identification data is not been registered in the ROM of the charge control microcomputer 118, the flow proceeds to step S105. On the other hand, if it is determined that the identification data is registered, the flow proceeds to step S108.

In the ROM of the charge control microcomputer 118, the identification data and the charge state data table for use at charging, which is associated with the identification data, are stored in advance for each battery pack model. Based on the identification data read out in step S103, the charge control microcomputer 118 reads out the charge state data table for use at charging, which is stored in the ROM of the microcomputer 118 such as to correspond to the identification data.

On the other hand, if the identification data and the charge state data table for use at charging associated with the identification data are not stored in the ROM of the charge control microcomputer 118, processing at steps S105 to S107 is carried out. This is a case where the battery pack is commercially available after the battery charger 101 was sold. In that case, the identification data and the charge state data table for use at charging of the newly commercialized battery pack are not stored in the ROM of the charge control microcomputer 118.

In step S105, the charge control microcomputer 118 reads out charge characteristic data from the nonvolatile memory 133 of the battery pack 128. To read out the charge characteristic data, the data readout process shown in FIG. 6 is carried out. Next, in step S106, the charge control microcomputer 118 generates a charge state data table for use at charging based on the charge characteristic data read out in step S105. As shown in FIGS. 12 to 14, the charge characteristic data is comprised of numerical data of the temperature at charging, the charge voltage, the charge current, etc. The charge control microcomputer 118 fills an empty data table with the numeric values read out as the charge characteristic data, thereby generating the charge state data table for use at charging.

Next, in step S107, the identification data read out in step S103 and the charge state data table for use at charging generated in step S106 are registered (stored) in the RAM by the charge control microcomputer 118 so as to be associated with each other, whereupon the flow proceeds to step S108.

It should be noted that instead of the charge state data at charging being registered in advance into the ROM of the charge control microcomputer 118, charge characteristic data may be read out from the nonvolatile memory 133 of the battery pack 128 and then the charge state data table for use at charging may be generated. In that case, it is unnecessary to provide the nonvolatile RAM in the charge control microcomputer 118.

In the following, charge state data tables for use at charging wilt be described.

Figure 16:
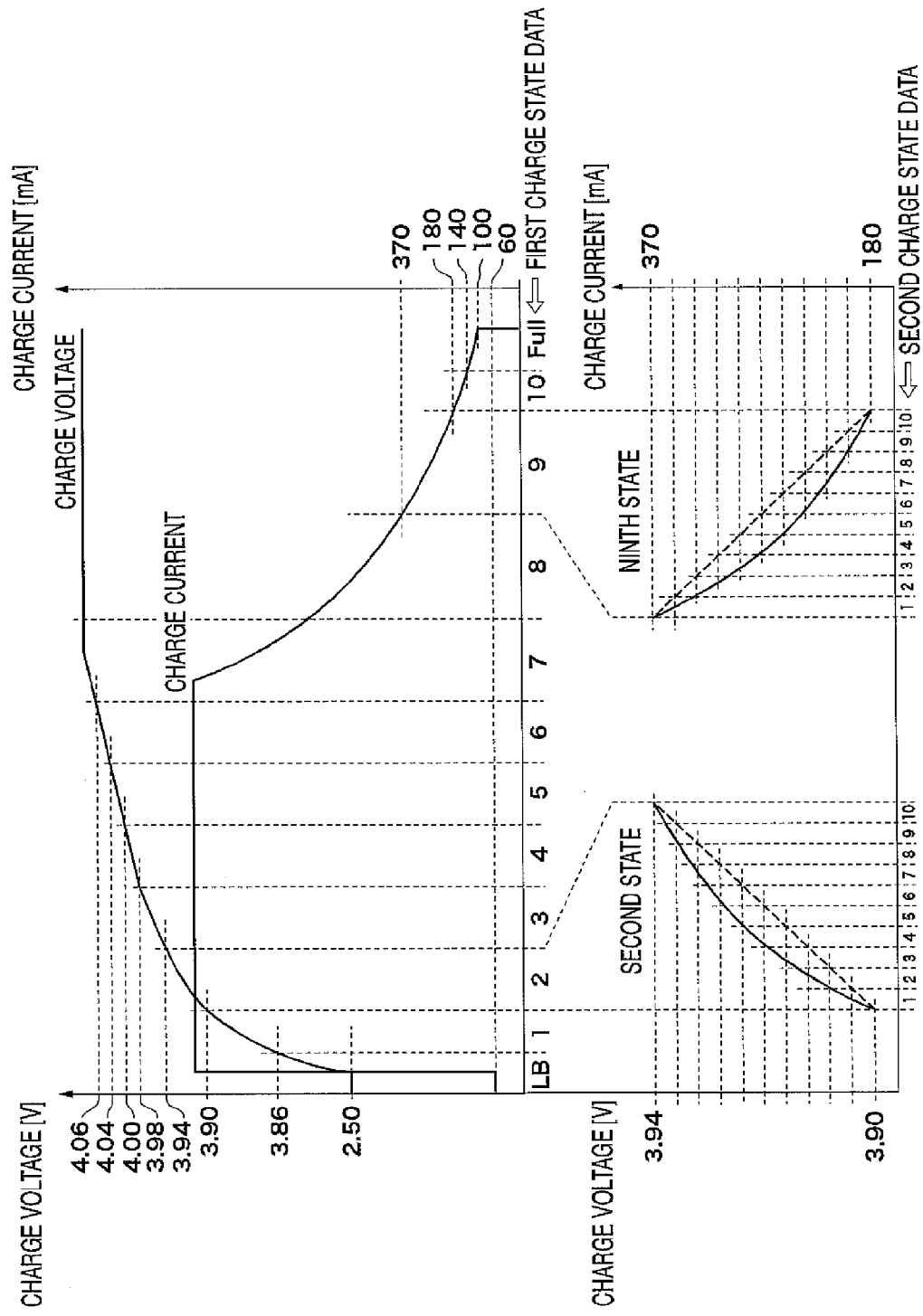
FIG. 16 is a view showing a relation between charge characteristics of the battery pack and first and second charge state data.
Figure 17:
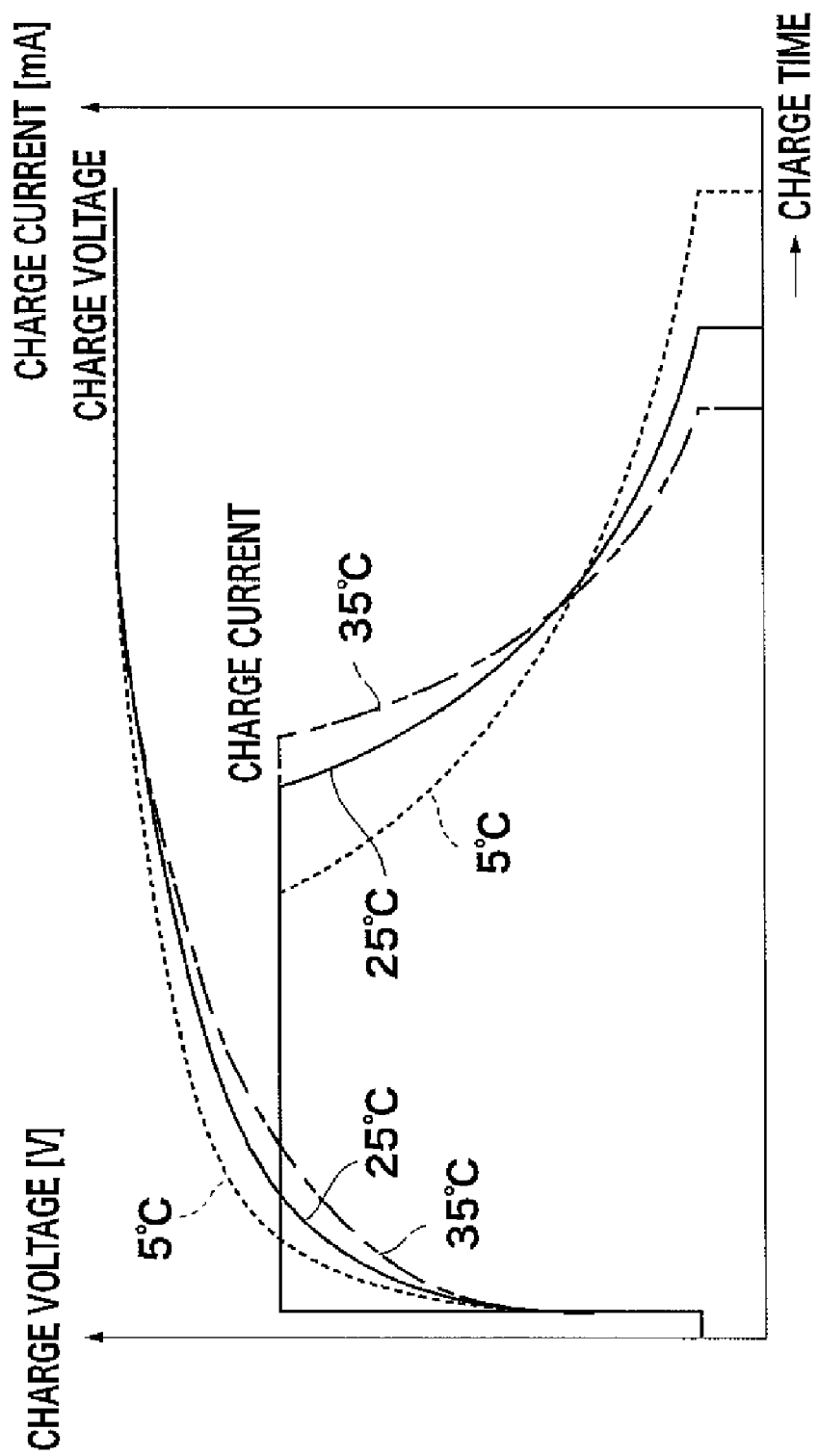
FIG. 17 is a view showing a temperature-dependent change in the charge characteristics.

FIGS. 12 to 15 show examples of charge state data tables for use at charging. FIG. 16 shows a relation between charge characteristics of the battery pack 128 and first and second charge state data. The illustrated charge characteristics include the charge current and the charge voltage at charging at a temperature of 25 degrees Celsius. FIG. 17 shows a temperature-dependent change in the charge characteristics.

In the charge state data tables for use at charging, first and second charge state data representing charge states of the battery pack 128 are made correspond to charge characteristic data.

FIGS. 12 to 14 show charge state data tables for use at charging, which are set differently between respective temperatures at charging. Specifically, the data table in FIG. 13 is used when the temperature at charging is less than 15 degrees Celsius. When the temperature at charging is within a range from 15 degrees Celsius (inclusive) to 35 degrees Celsius (exclusive), the data table shown in FIG. 12 is used. When the temperature at charging is equal to or higher than 35 degrees Celsius, the data table shown in FIG. 14 is used. This is because the charge voltage and charge current of the battery pack 128 vary depending on the charge temperature as shown in FIG. 17. Specifically, when the temperature at charging is low (5 degrees Celsius), there is a tendency that the charge voltage rises earlier, the charge current decreases earlier, and the charge time to reach the full charge state becomes longer than those at normal temperature (25 degrees Celsius). On the other hand, when the temperature at charging is high (35 degrees Celsius), there is a tendency that the charge voltage rises slower, the charge current decreases slower, and the charge time to reach the full charge state becomes shorter than those at normal temperature.

In each of the charge state data tables for use at charging, first charge state data is defined to represent twelve stages of the charge state of the battery pack 128, i.e., an LB state (LB is an abbreviation of low battery) which is a discharge state, first to tenth states, and a Full state thereof. Each of the LB state to the eighth state is set based on the charge voltage, which is one of the charge characteristics, whereas each of the ninth state to the Full state is set based on the charge current, which is another charge characteristic. This is because the charge voltage does not vary in a region near the full charge and cannot appropriately represent charge states in such a region. On the other hand, the charge current does not vary in a region not near the full charge but starts to vary in a region near the full charge. In the region from the LB state to the eighth state where the charge voltage varies, the charge state is determined based on the charge voltage, whereas in the region from the ninth state to the Full state where the charge current varies, the charge state is determined based on the charge current.

In the charge state data tables for use at charging, second charge state data is defined to divide each stage of the first charge state data, as shown in FIG. 15. In the second charge state data, the second state to the ninth state of the first charge state data are each divided into ten stages, a combination of the first state and the LB state of the first charge state data is divided into ten stages, and a combination of the tenth state and the Full state of the first charge state data is divided into ten stages. By the first and second charge state data, the charge state of the battery pack 128 can be represented in 100 stages. In other words, the charge state is managed in units of 1 percent.

As shown in FIG. 16, the second charge state data belonging to one of the LB to eighth states of the first charge state data, which are defined based on the charge voltage, is also defined based on the charge voltage. On the other hand, the second charge state data belonging to one of the ninth to Full states of the first charge state data, which are defined based on the charge current, is also defined based on the charge current.

Referring to FIG. 3 again, in step S108, the charge control microcomputer 118 starts charging. Next, in step S109, full charge capacity data is read out from the nonvolatile memory 133 of the battery pack 128. In step S110, first and second charge state data are read out from the nonvolatile memory 133. In step S111, charge history data is read out from the nonvolatile memory 133. To perform data readout in each of steps S109 to S111, the data readout process shown in FIG. 6 is carried out. The read-out data are stored in the RAM of the charge control microcomputer 118.

Next, in step S112, the charge control microcomputer 118 measures the temperature of the battery pack 128 by means of the thermistor 134 of the battery pack 128 (battery pack temperature measurement process).

Figure 8:
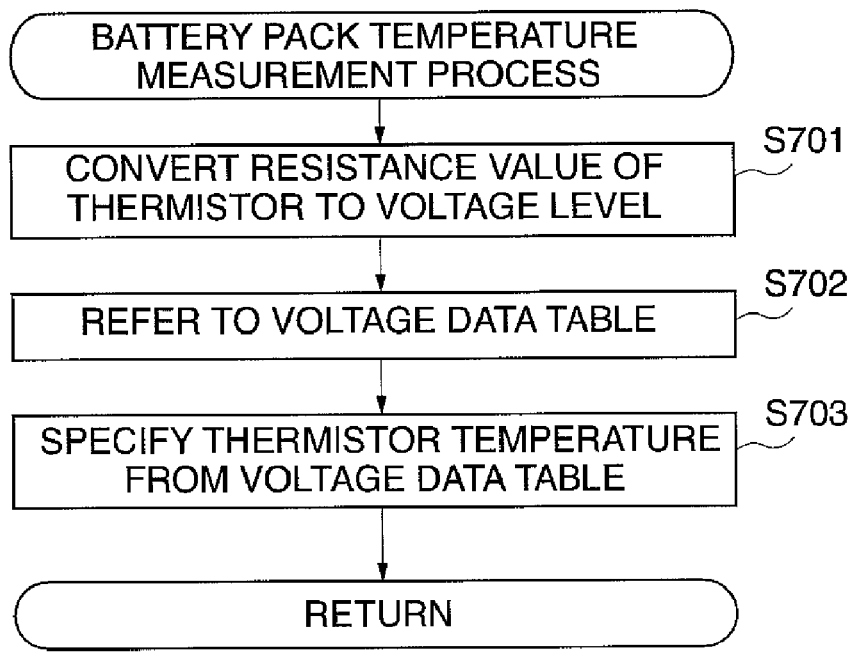
FIG. 8 is a flowchart showing in detail a battery pack temperature measurement process shown in FIG. 3.

FIG. 8 shows in flowchart the details of the battery pack temperature measurement process at step S112 in FIG. 3.

Referring to FIG. 8, in step S701, the charge control microcomputer 118 applies a predetermined voltage to the thermistor 134 via a resistor (not shown) to convert the resistance value of the thermistor 134 into a voltage level. Next, in step S702, a voltage data table (not shown) set in advance is referred to based on the voltage level obtained by the conversion in step S701. The voltage data table is stored in the ROM of the charge control microcomputer 118. In the voltage data table, a relation between temperature and thermistor resistance value is set so that temperature may be estimated from voltage level.

In step S703, the charge control microcomputer 118 specifies, in the voltage data table referred to, a thermistor temperature corresponding to the voltage level determined by the conversion in step S701. Whereupon, the process returns to the main flow.

Referring to FIG. 3 again, in step S113, the charge control microcomputer 118 writes the battery pack temperature measured in step S112 as the temperature data at charging into the nonvolatile memory 133 of the battery pack 128, thereby renewing the temperature data at charging. To write the temperature data at charging, a data write process shown in FIG. 7 is carried out.

Figure 7:
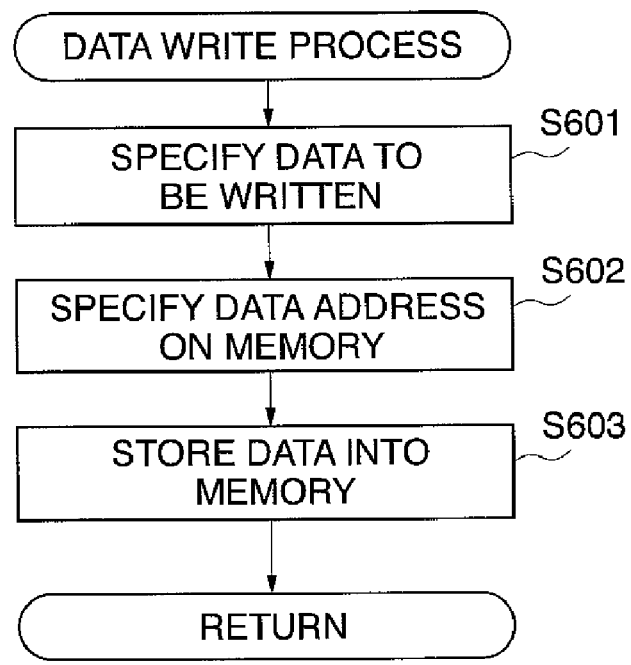
FIG. 7 is a flowchart showing a data write process for writing data into the nonvolatile memory.

In step S601 in FIG. 7, the charge control microcomputer 118 specifies data to be written into the nonvolatile memory 133 of the battery pack 128. In the case of step S113 in FIG. 3, the temperature data at charging is specified. Next, in step S602, a data address on the nonvolatile memory 133 is specified. In the case of step S113 in FIG. 3, a data address for the temperature data at charging is specified. Next, in step S603, the data (here, the temperature data at charging) is written into a predetermined address of the nonvolatile memory 133 of the battery pack 128, whereupon the process returns to the main flow.

Referring to FIG. 3 again, in step S114, the charge control microcomputer 118 carries out a charge state data calculation process.

Figure 9:
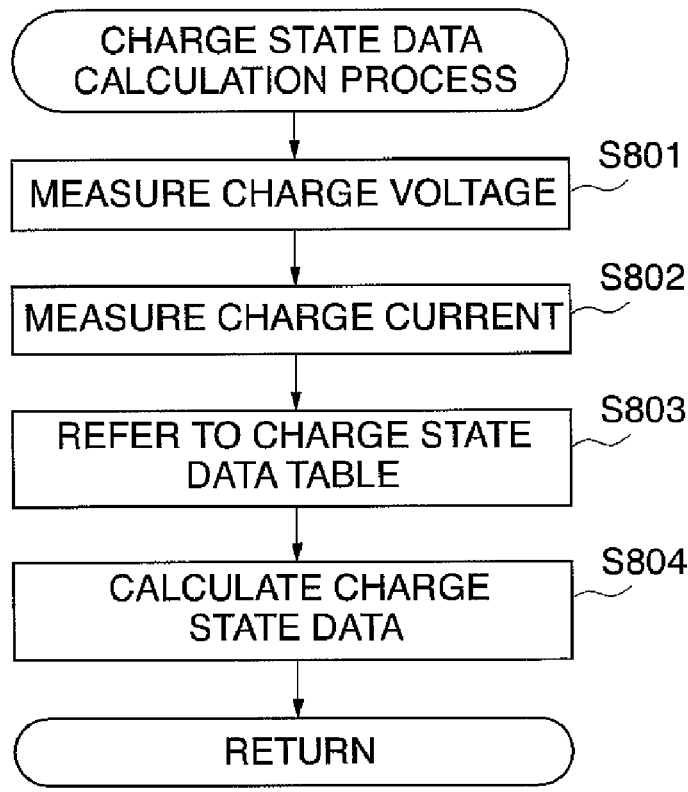
FIG. 9 is a flowchart showing in detail a charge state data calculation process shown in FIG. 3.

FIG. 9 shows in flowchart the charge state data calculation process at step S114 in FIG. 3.

In step S801 in FIG. 9, the charge control microcomputer 118 measures a charge voltage of the battery pack 128 by means of the resistors 121, 122. Next, in step S802, a charge current of the battery pack 128 is measured based on a potential difference between the both ends of the current detection resistor 120.

Next, in step S803, the charge control microcomputer 118 refers to a charge state data table for use at charging corresponding to the temperature measured in step S112 from among charge state data tables for use at charging which are associated with the identification data read out in step S103. The charge state data table for use at charging to be referred to is stored in the ROM of the charge control microcomputer 118 or is generated in steps S105 to S107. Next, in step S804, on the basis of the charge voltage measured in step S801 and the charge current measured in step S802, first and second charge state data are calculated from the charge state data table for use at charging referred to in step S803, whereupon the process returns to the main flow.

FIGS. 12 and 15 show an example of the charge state data table for use at the time of charging, at a temperature of 25 degrees Celsius, the battery pack having a full charge capacity of 700 mAh. For example, when the charge voltage Vb is at 3.930 [V], the first charge state data is determined to be in the second state in FIG. 12 and the second charge state data is determined to be equal to "8" in FIG. 15. This indicates that the full charge capacity ratio is 18% and the charge capacity is 126 mAh.

In steps S115 to S118 in FIG. 4, a series of processing is carried out to obtain full charge capacity data reflecting the deterioration in the charge capacity of a battery pack left unattended in a full charge state. Even if not being used with electronic equipment, a lithium ion secondary battery or the like decreases in its chargeable capacity when left unattended in a full charge state. Hereinafter, such reduction in the charge capacity is called the left-charged battery deterioration.

In step S115, the charge control microcomputer 118 determines whether or not the charge history data read out in step S111 is equal to a value of "0". If the data is equal to "0", the process proceeds to step S119. On the other hand, if the data is equal to "1", the process proceeds to step S116.

In step S116, the charge control microcomputer 118 compares the first charge state data read out in step S110 with the first charge state data calculated in step S114, and determines whether or not the battery cycle deterioration (the battery deterioration due to repeated charge cycles) should be corrected. As a result of the data comparison, if both the first charge state data coincide with each other, the charge control microcomputer 118 determines that the correction of battery cycle deterioration is unnecessary, whereupon the process proceeds to step S119. On the other hand, if both the first charge state data do not coincide with each other, the charge control microcomputer 118 determines that the correction of battery cycle deterioration is required, whereupon the process proceeds to step S117 in which a battery cycle deterioration correcting process (i.e., a process for correcting battery deterioration due to repeated charge cycles) is carried out.

Figure 10:
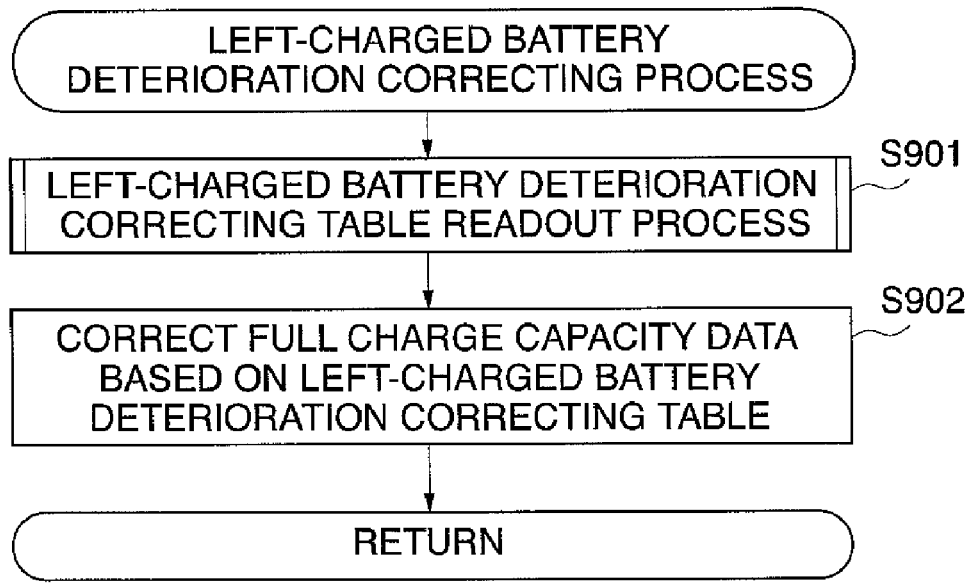
FIG. 10 is a flowchart showing in detail a left-charged battery deterioration correcting process shown in FIG. 4.

FIG. 10 shows in flowchart the details of the battery cycle deterioration correcting process in step S117 of FIG. 4.

Referring to FIG. 10, in step S901, the charge control microcomputer 118 reads out a left-charged battery deterioration correcting table (i.e., a table for correcting the deterioration of a battery left unattended in a charged state) from the nonvolatile memory 133 of the battery pack 128. To read out the left-charged battery deterioration correcting table, the data readout process shown in FIG. 6 is carried out.

Next, in step S902, the charge control microcomputer 118 corrects the full charge capacity data based on the read-out left-charged battery deterioration correcting table. To this end, a left-charged battery deterioration correcting value corresponding to the charge state data calculated in step S114 is specified from the left-charged battery deterioration correcting table, and the left-charged battery deterioration correcting value is subtracted from the full charge capacity data. An example of the left-charged battery deterioration correcting table is shown in FIG. 18.

Referring to FIG. 18, the left-charged battery deterioration correcting table indicates that an amount of deterioration occurring when the first charge state data stored in the nonvolatile memory 133 is in the Full state is larger than that occurring when the first charge state data stored in the nonvolatile memory 133 is in the tenth state. This is because the closer the battery state to the full charge, the larger the deterioration of a left unattended lithium ion secondary battery becomes.

In the left-charged battery deterioration correcting table, the left-charged battery deterioration correcting values are set such as to respectively correspond to various combinations of first charge state data stored in the nonvolatile memory 133 of the battery pack 128 and first charge state data calculated in step S114. In FIG. 18, if, for example, that the first charge state data stored in the nonvolatile memory 133 is in the Full state and the first charge state data calculated in step S114 is in the Full state or the tenth state, the left-charged battery deterioration is not caused, and the left-charged battery deterioration correcting value becomes equal to "0". As a result, in step S902 of FIG. 10, the full charge capacity data value remains unchanged.

On the other hand, if the first charge state data stored in the nonvolatile memory 133 is in the Full state and the first charge state data calculated in step S114 is in the ninth state, the left-charged battery deterioration correcting value becomes equal to "1". This indicates that the full charge capacity is deteriorated by 1 [mAh]. In step S902, 1 [mAh] is subtracted from the full charge capacity data value. If the first charge state data stored in the nonvolatile memory 133 is in the Full state and the first charge state data calculated in step S114 is in the eighth state, 2 [mAh] is subtracted from the full charge capacity data value in step S902.

Referring to FIG. 4 again, in step S118, the charge control microcomputer 118 rewrites the full charge capacity data stored in the nonvolatile memory 133 of the battery pack 128 into the full charge capacity data corrected in step S117, whereupon the flow proceeds to step S119. To write the full charge capacity data into the nonvolatile memory 133 in step S118, the data write process shown in FIG. 7 is carried out. By performing the series of processing in steps S115 to S118, it is possible to correct the deterioration of the secondary battery left unattended in a charged state and to carry out the indication of residual capacity more accurately. Even if the full charge capacity data is rewritten, the charge count data is not rewritten.

In step S119 in FIG. 4, the charge control microcomputer 118 determines whether or not it is necessary to rewrite the charge state data stored in the nonvolatile memory 133 of the battery pack 128. To this end, whether or not the charge state data calculated in step S114 exceeds the charge state data read out from the nonvolatile memory 133 is determined. As a result, if it is determined that the charge state data calculated in step S114 does not exceed the charge state data read out from the nonvolatile memory 133, the charge state data stored in the memory 133 is determined as unnecessary to be rewritten, whereupon the flow proceeds to step S109 in FIG. 3. On the other hand, if the calculated charge state data exceeds the read-out charge state data, the flow proceeds to step S120.

In step S120, the charge control microcomputer 118 sets a value of "1" to the charge history data read into the RAM of the charge control microcomputer 118. In the next step S121, a value of "1" is written into a data address of the charge history data stored in the nonvolatile memory 133 of the battery pack 128. To write the charge history data, the data write process shown in FIG. 7 is carried out.

In steps S122 to S127, a series of processing to reflect the degree of deterioration of the full charge capacity of the repeatedly charged and discharged battery pack 128 to the full charge capacity data is carried out. In general, a reduction occurs in the chargeable capacity of the secondary battery when the battery is repeatedly charged and discharged. This reduction in the charge capacity is called the battery cycle deterioration (the battery deterioration due to repeated charge cycles). In this embodiment, each time one-cycle charging and discharging of the battery pack 128 is carried out, an amount of deterioration of the full charge capacity is reflected to the full charge capacity data.

In step S122, the charge control microcomputer 118 reads out charge count data from the nonvolatile memory 133 of the battery pack 128. To read out the charge count data, the data readout process shown in FIG. 6 is carried out. Next, in step S123, a value of "1" is added to the charge count data read out in step S122. In step S124, the charge count data after addition is written into the nonvolatile memory 133 of the battery pack 128 to thereby renew the charge count data, whereupon the flow proceeds to step S125 in FIG. 5. To write the charge count data, the data write process shown in FIG. 7 is carried out.

In step S125, the charge control microcomputer 118 counts, by means of the charge count data, the number of times the charge state data has been rewritten, to thereby determine whether or not charging corresponding to one cycle has been performed. For example, if the charge count data is 10 counts, it is determined that charging for one cycle has been performed. As a result of the determination in step S125, if the number of charge cycles is determined to be less than one cycle, the charge control microcomputer 118 determines that it is unnecessary to carry out the correction of battery cycle deterioration, whereupon the flow proceeds to step S128. On the other hand, if the number of charge cycles is determined to be equal to or greater than one cycle, it is determined that the correction of battery cycle deterioration is necessary, and the battery cycle deterioration correcting process is carried out (step S126). By performing the series of processing in steps 122 to S127, it is possible to correct the deterioration of the second battery caused by repeated charge cycles (the battery cycle deterioration) and to provide more accurate indication of residual capacity.

Referring is made to a battery cycle deterioration correcting table stored in the nonvolatile memory 133 of the battery pack 128. An example of the battery cycle deterioration correcting table is shown in FIG. 19.

Referring to FIG. 19, in the battery cycle deterioration correcting table, a battery cycle deterioration correcting value (an amount of deterioration of full charge capacity) for one-cycle charging is equal to 0.42 [mAh] when the number of charge cycles varies in a range from 1 to 50. When the number of charge cycles varies in a range from 51 to 100, the battery cycle deterioration correcting value is equal to 0.7 [mAh].

When the number of charge cycles varies in a range from 101 to 150, the battery cycle deterioration correcting value is equal to 0.98 [mAh].

Figure 11:
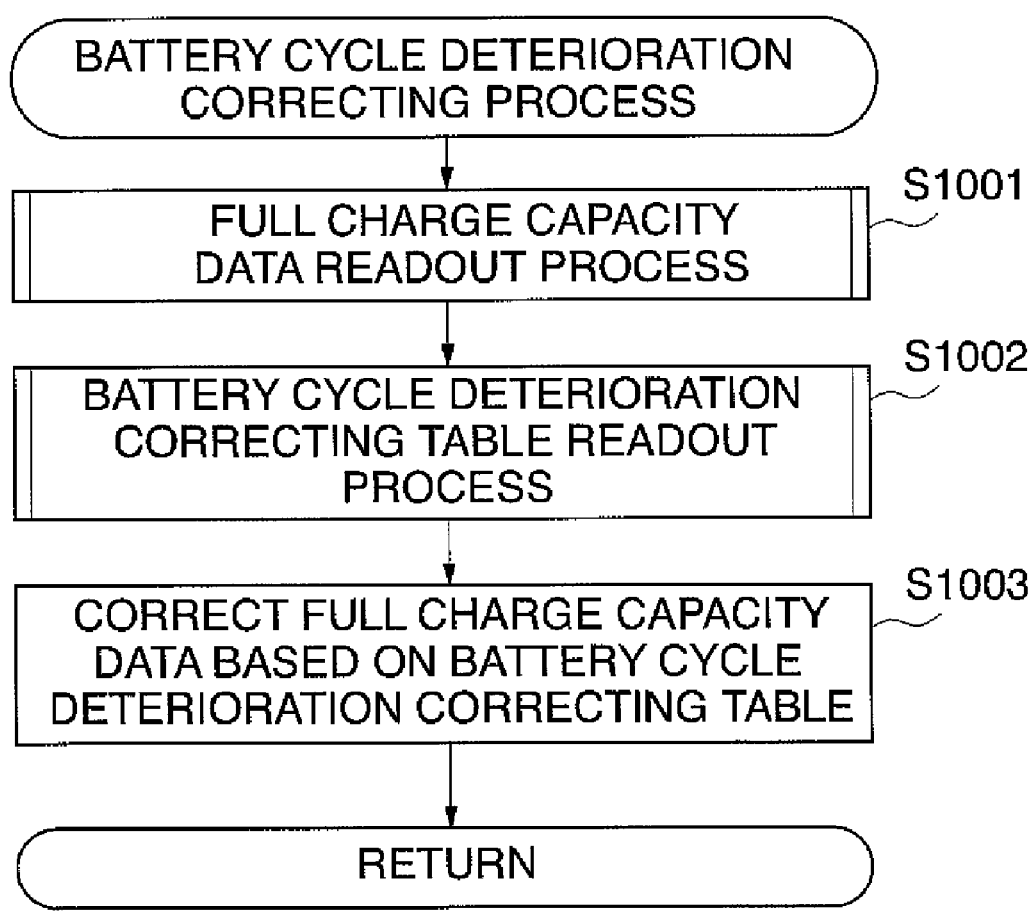
FIG. 11 is a flowchart showing in detail a battery cycle deterioration correcting process shown in FIG. 5.

FIG. 11 shows in flowchart the details of the battery cycle deterioration correcting process performed in step S126 in FIG. 5.

Referring to FIG. 11, the charge control microcomputer 118 reads out the full charge capacity data and the battery cycle deterioration correcting table from the nonvolatile memory 133 of the battery pack 128 (steps S1001 and S1002) To read out the data, the data readout process shown in FIG. 6 is carried out.

Next, in step S1003, the full charge capacity data is corrected based on the read-out battery cycle deterioration correcting table. A battery cycle deterioration correcting value corresponding to the number of charge cycles determined from the charge count data is specified from the battery cycle deterioration correcting table. Then, the battery charge deterioration correcting value is subtracted from the full charge capacity data. For example, in the case of the number of charge cycles being in a range from 1 to 50, a value of 0.42 [mAh] is subtracted from the full charge capacity data per one-cycle charging. It should be noted that in this embodiment, the method for correction of the battery cycle deterioration in which a fixed correction value is subtracted from full charge capacity data has been described. However, an approximate formula may be used to reproduce a battery cycle deterioration characteristic curve, and an amount of battery cycle deterioration may be determined therefrom.

Referring to FIG. 5 again, in step S127, the charge control microcomputer 118 rewrites the full charge capacity data stored in the nonvolatile memory 133 of the battery pack 128 into the full charge capacity data corrected in step S126, whereupon the flow proceeds to step S128. To write the full charge capacity data into the nonvolatile memory 133 in step S126, the data write process shown in FIG. 7 is carried out. By performing the series of processing in steps S122 to S127, the deterioration of the second battery caused by repeated charge cycles (the battery charge deterioration) can be corrected and a more accurate residual capacity indication can be achieved.

In step S128, the charge control microcomputer 118 writes the first and second charge state data calculated in step S114 into data addresses of the first and second charge state data in the nonvolatile memory 133 of the battery pack 128. To write the charge state data into the nonvolatile memory 133, the data write process shown in FIG. 7 is carried out.

Next, in step S129, the charge control microcomputer 118 performs control to display the charge state of the battery pack 128 on the display 139 of the battery charger 101 based on the current first and second charge state data calculated in step S114.

Figure 20:
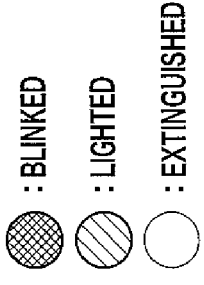
FIG. 20 is a view showing an example of charge state indication displayed on a display of the battery charger.

FIG. 20 shows examples of a charge state indication displayed on the display 139 of the battery charger 101.

Referring to FIG. 20, if the display 139 is comprised of five LEDs, the indication is made according to a first example of LED indication shown in FIG. 20. If the display 139 is comprised of three LEDs, the indication is made according to a second example of LED indication shown in FIG. 20.

In the first example of LED indication, only a first LED is lighted on when the first charge state data is in a range from the LB state to the second state. When the first charge state data is in a range from a third state to a fourth state, the first and second LEDs are lighted on. In a range from the fifth state to the sixth state, the first to third LEDs are lighted on. In a range from the seventh state to the eighth state, the first to fourth LEDs are lighted on. In a range from the ninth state to the Full state, the first to fifth LEDs are lighted on.

In the second example of LED indication, only a first LED is lighted on when the first charge state data is in the range from the LB state to the second state. In the range from the third state to the fourth state, the first LED is blinked. In the range from the fifth state to the sixth state, the first LED is lighted on and the second LED is blinked. In the range from the seventh state to the eighth state, the first and second LEDs are lightened on and the third LED is blinked. In the range from the ninth state to the Full state, all the LEDs are lightened on. By combining blinking states of LEDs, a more detailed indication can be achieved.

Referring to FIG. 5 again, the charge control microcomputer 118 determines in step S130 whether or not the charge voltage and current coincide with a charge completion condition, thereby determining whether or not charging should be completed. If the charge voltage and charge current do not coincide with the charge completion condition, the flow proceeds to step S109 to continue the charging. If the charge voltage and charge current satisfy the charge completion condition, the charging is completed.

Next, electronic equipment according to one embodiment of this invention will be described.

Figure 21:
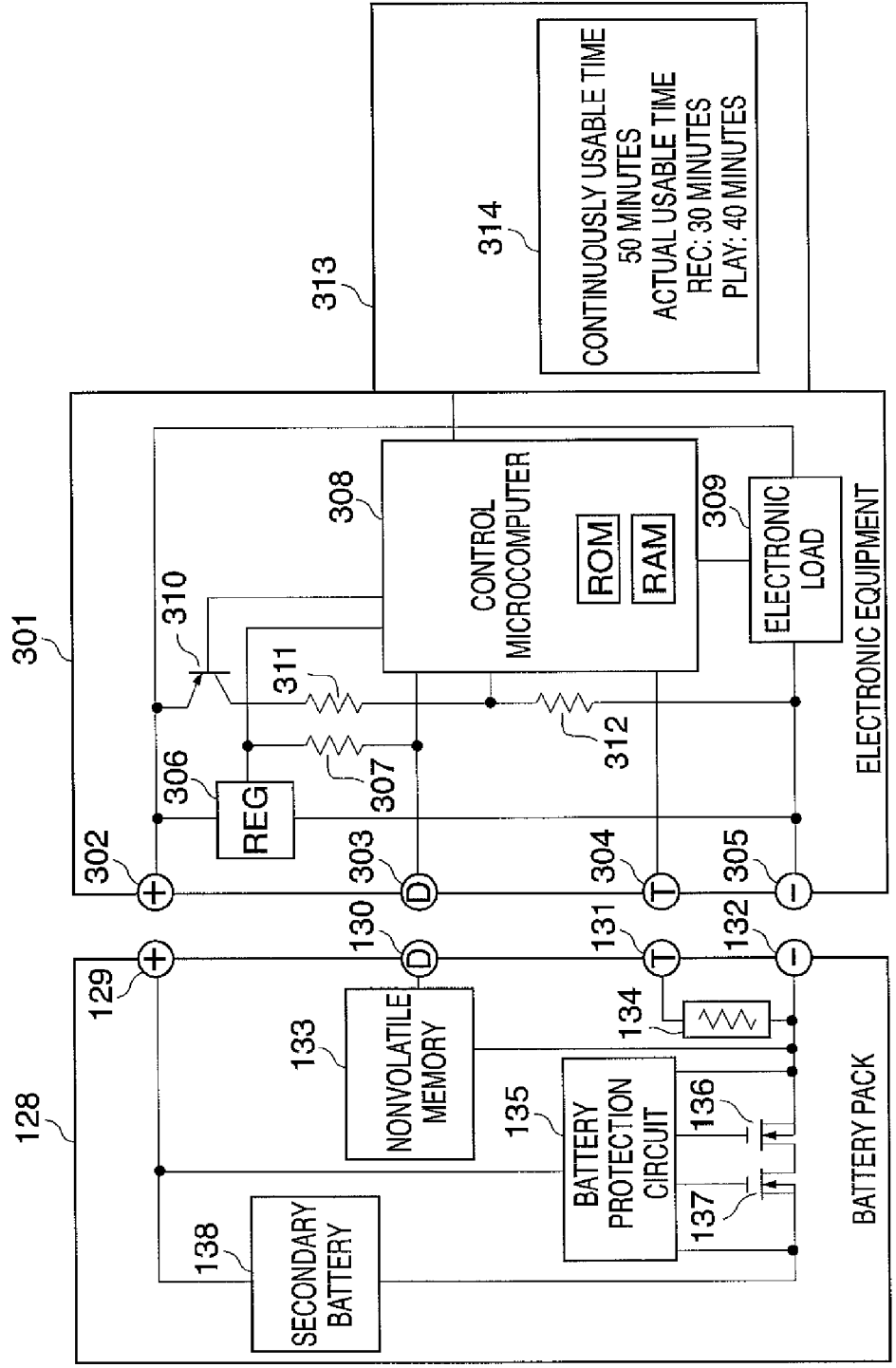
FIG. 21 is a block diagram showing the internal constructions of electronic equipment and the battery pack.

FIG. 21 shows in block diagram the internal constructions of the electronic equipment and the battery pack according to the embodiment. Structural parts which are the same as those of the embodiment of FIG. 1 are denoted by the same numerals, and explanations thereof are omitted.

In FIG. 21, the electronic equipment 301 is a digital camera, a digital video camera, or some other electronic equipment to which the battery pack 128 as a power source is attached.

In the electronic equipment 301, a positive terminal 302 is adapted to be in contact for electrical connection with the positive terminal 129 on the battery pack side when the battery pack 128 is attached to the electronic equipment 301. A communication (D) terminal 303 is adapted to be in contact for electrical connection with the communication (D) terminal 130 on the battery pack side when the battery pack 128 is attached to the electronic equipment 301. A temperature (T) terminal 304 is adapted to be in contact for electrical connection with the temperature (T) terminal 131 on the battery pack side when the battery pack 128 is attached to the electronic equipment 301. A negative terminal 305 is adapted to be in contact for electrical connection with the negative terminal 132 on the battery pack side when the battery pack 128 is attached to the electronic equipment 301.

A regulator (REG) 306 is for supplying a prescribed DC to the control microcomputer 308. A resistor 307 acts as a pull-up resistor. Resistors 311, 312 are voltage-divider resistors for use in measuring an output voltage of the battery pack 128. An electrical load 309 represents load of electronic equipment 301 that varies according to an operation mode. The operation mode is a type of operation in which the electronic equipment 301 is operable. In this embodiment where the electronic equipment 301 is comprised of a digital camera, there may be mentioned a shooting mode (REC mode) to shoot an image, a playback mode (PLAY mode) to play back the shot image, and the like.

The control microcomputer 308 is a control circuit having a nonvolatile RAM and a ROM. The control microcomputer 308 measures the output voltage of the battery pack 128 by means of the resistors 311, 312, and measures the temperature of the battery pack 128 by means of the thermistor 134 of the battery pack 128. The control microcomputer 308 reads out the data and table information shown in FIG. 2 from the nonvolatile memory 133 of the battery pack 128, and based on the read-out data and table, determines the charge state of the battery pack 128. Furthermore, the control microcomputer 308 accesses the nonvolatile memory 133 of the battery pack 128 and reads out various data therefrom or writes various data therein.

The control microcomputer 308 detects an operation mode set in the electronic equipment 301, and measures a time period of operation in that mode. Based on the measured time period of operation and the power consumption data table for each operation mode stored in the ROM of the control microcomputer 308, an amount of power consumption is calculated. Then, based on the calculated power consumption amount, the first and second charge state data stored in the nonvolatile memory 133 of the battery pack 128 are rewritten.

A transistor 310 is a switch for being turned on when the output voltage of the battery pack 128 is measured by the control microcomputer 308. In the illustrated example, the transistor 310 is used. An FET switch is used for a more accurate measurement. A display unit 313 is comprised of an LCD (liquid crystal display), a CVF (color view finder), LEDs (light emitting diodes), etc. A display screen 314 is an example of screens displayed on the display unit 313. On the display screen 314, a continuously usable time and an actual usable time representing the residual capacity of the battery pack 128 are displayed.

When the battery pack 128 is attached to the electronic equipment 301, the positive terminal 302 of the electronic equipment 301 is connected to the positive terminal 129 of the battery pack 128, and the negative terminal 305 of the electronic equipment 301 is connected to the negative terminal 132 of the battery pack 128. At the same time, the communication (D) terminal 303 of the electronic equipment 301 is connected to the communication (D) terminal 130 of the battery pack 128, and the temperature (T) terminal 304 of the electronic equipment 301 is connected to the temperature (T) terminal 131 of the battery pack 128. When the output voltage of the battery pack 128 is applied to the regulator 306, the regulator 306 applies a stable voltage to the control microcomputer 308.

Figure 22:
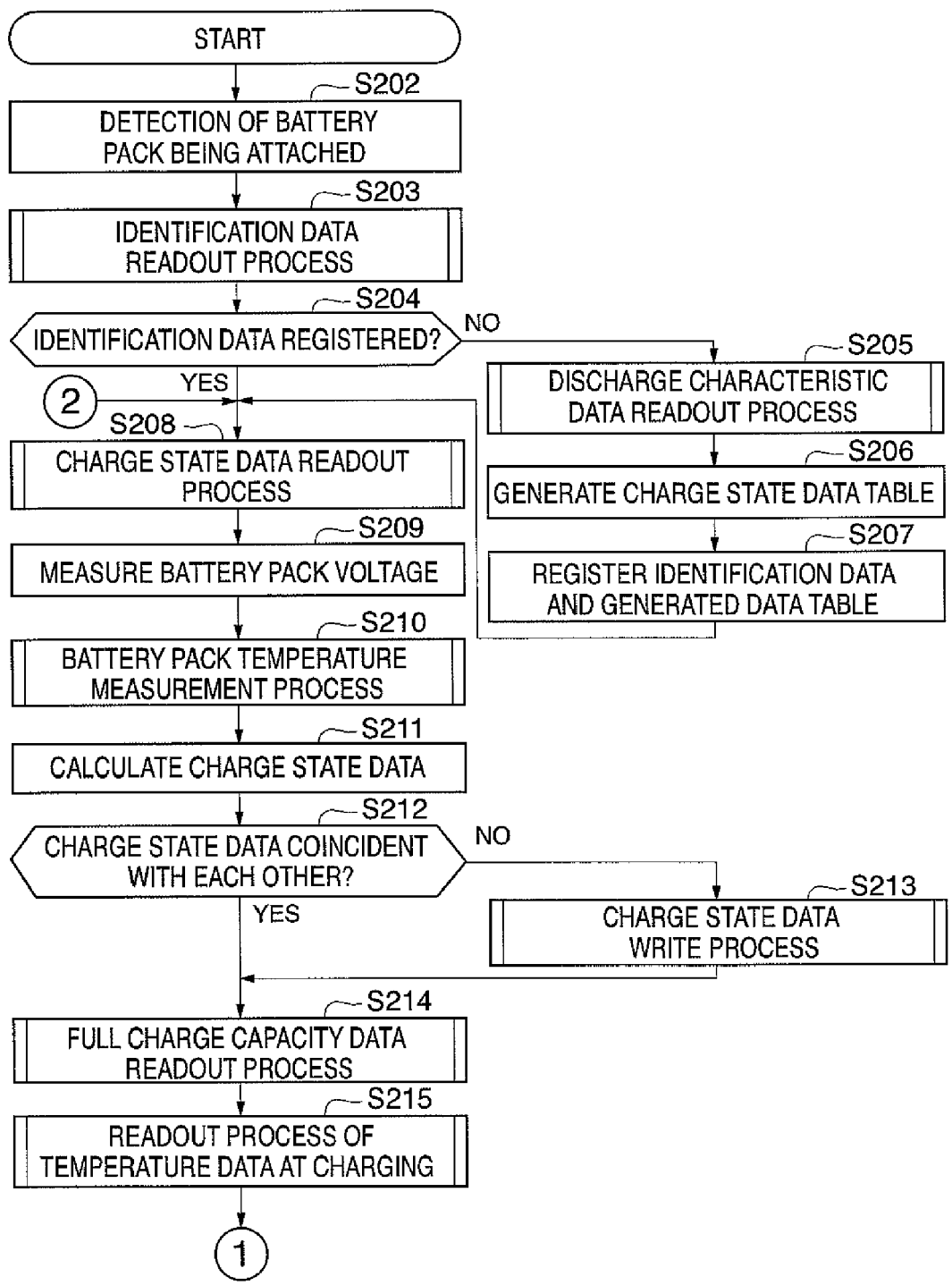
FIG. 22 is a flowchart showing a part of an operation process of the electronic equipment to which the battery pack has been attached.
Figure 23:
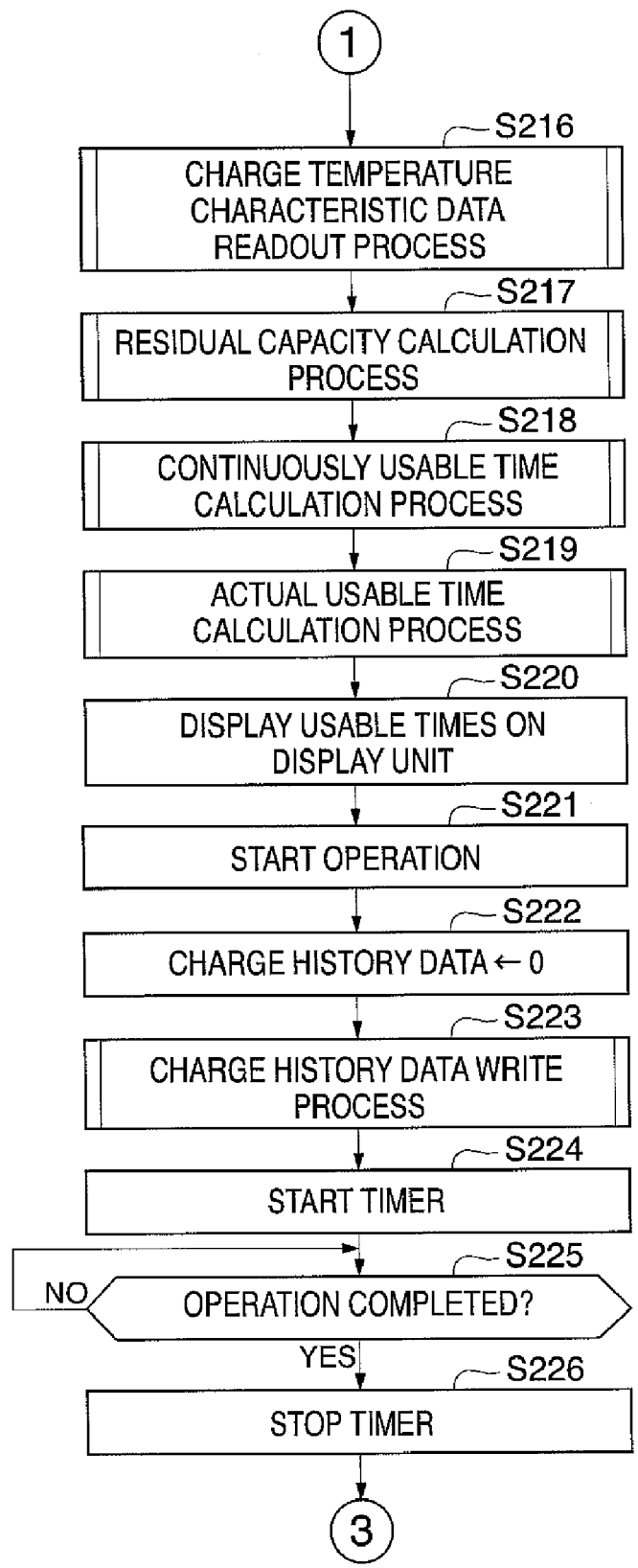
FIG. 23 is a flowchart showing another part of the operation process that follows the flowchart of FIG. 22.
Figure 24:
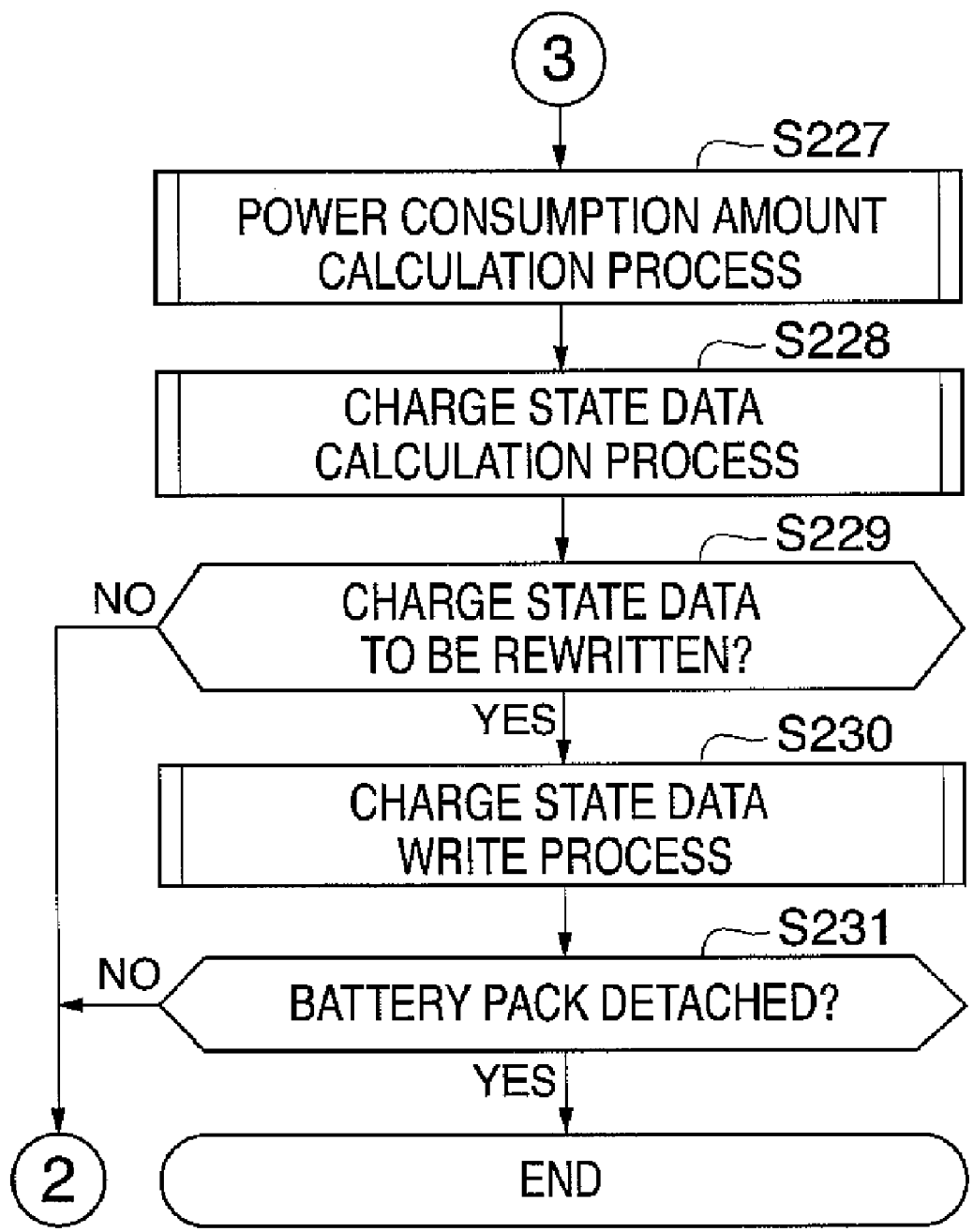
FIG. 24 is a flowchart showing the remaining part of the operation process that follows the flowchart of FIG. 23.

FIGS. 22 to 24 show in flowchart a process of operation of the electronic equipment 301 to which the battery pack 128 has been attached.

Referring to FIG. 22, when detecting that the battery pack 128 has been attached (step S202), the control microcomputer 308 reads out identification data from the nonvolatile memory 133 of the battery pack 128 via the communication terminals 303, 130 (step S203). To read out the identification data from the nonvolatile memory 133, the data readout process shown in FIG. 6 is carried out.

Next, in step S204, the control microcomputer 308 determines whether or not the identification data read out in step S203 is stored (registered) in the ROM of the control microcomputer 308. As a result, if it is determined that the identification data is not registered in the ROM of the control microcomputer 308, the flow proceeds to step S205. On the other hand, if the identification data is registered, the flow proceeds to step S208.

In the ROM of the control microcomputer 308, the identification data and the charge state data table for use at discharging associated with the identification data are stored in advance for every model of battery pack. Based on the identification data read out in step S203, the control microcomputer 308 reads out the charge state data table for use at discharging that corresponds to the identification data stored in the ROM of the control microcomputer 308.

On the other hand, if the identification data and the charge state data table for use at discharging associated with the identification data are not stored in the ROM of the control microcomputer 308, the processing in steps S205 to S207 is carried out. This is because if the battery pack is newly commercialized after the electronic equipment 301 was put on the market, the identification data and the charge state data table for use at discharging of the newly commercialized battery pack are not stored in the ROM of the control microcomputer 308.

In step S205, the control microcomputer 308 reads out the discharge characteristic data from the nonvolatile memory 133 of the battery pack 128. To read out the discharge characteristic data, the data readout process shown in FIG. 6 is carried out.

Next, in step S206, the control microcomputer 308 creates the charge state data table for use at discharging based on the discharge characteristic data read out in step S205. The control microcomputer 308 fills values read out as the discharge characteristic data into an empty data table, thereby creating the charge state data table for use at discharging.

Next, in step S207, the control microcomputer 308 registers (stores) the identification data read out in step S203 and the charge state data table for use at discharging created in step S206 into the RAM in such a way that the identification data and the charge state data table are associated with each other, whereupon the flow proceeds to step S208.

Instead of registering the charge state data tables for use at discharging in the ROM of the control microcomputer 308 in advance, discharge characteristic data may be read out from the nonvolatile memory 133 of the battery pack 128 and a charge state data table for use at discharging may be created. In that case, it is unnecessary to provide the nonvolatile RAM in the control microcomputer 308.

Figure 34:
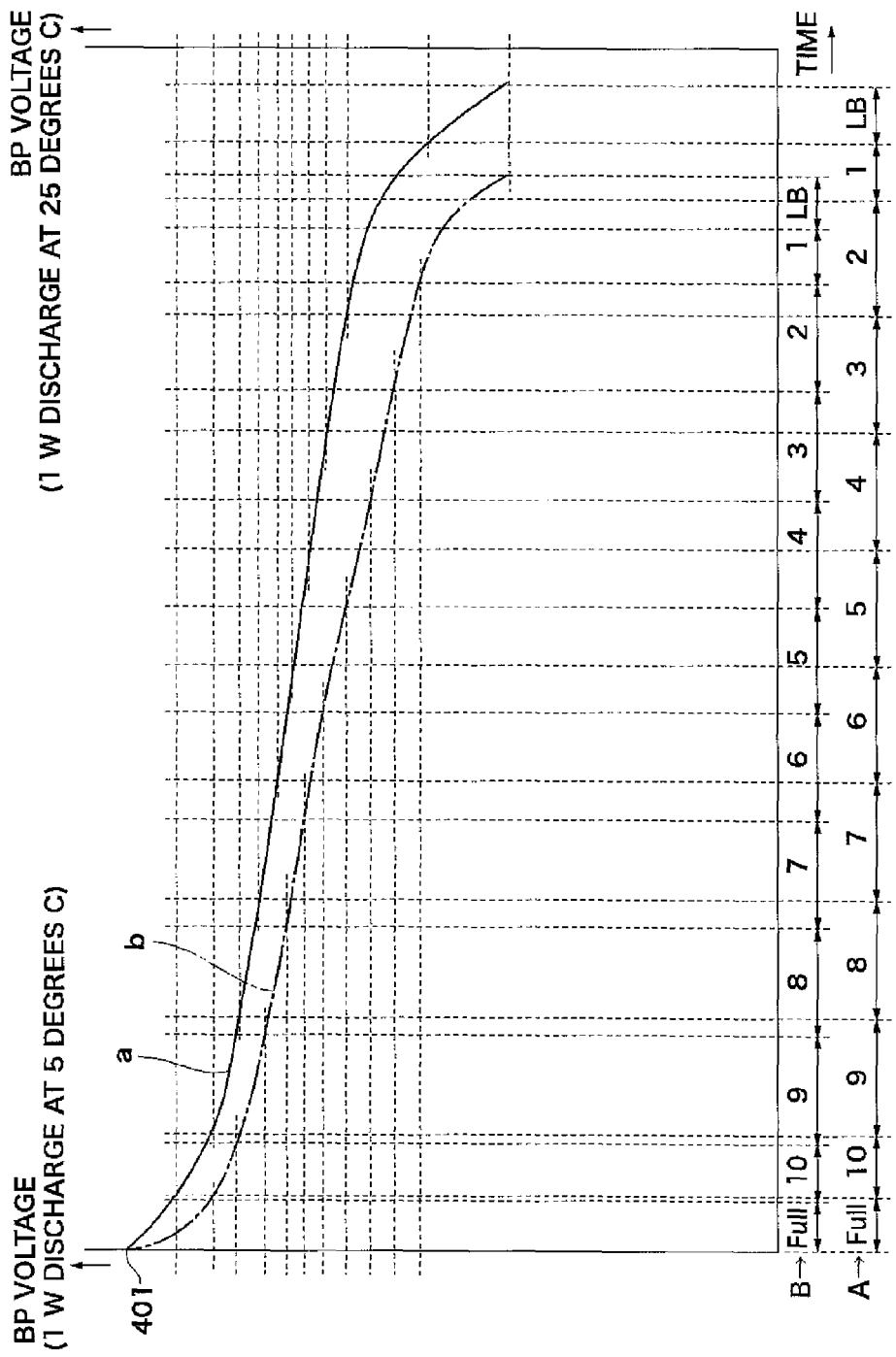
FIG. 34 is a view showing a relation between discharge temperature characteristic of the battery pack and first charge state data.
Figure 35:
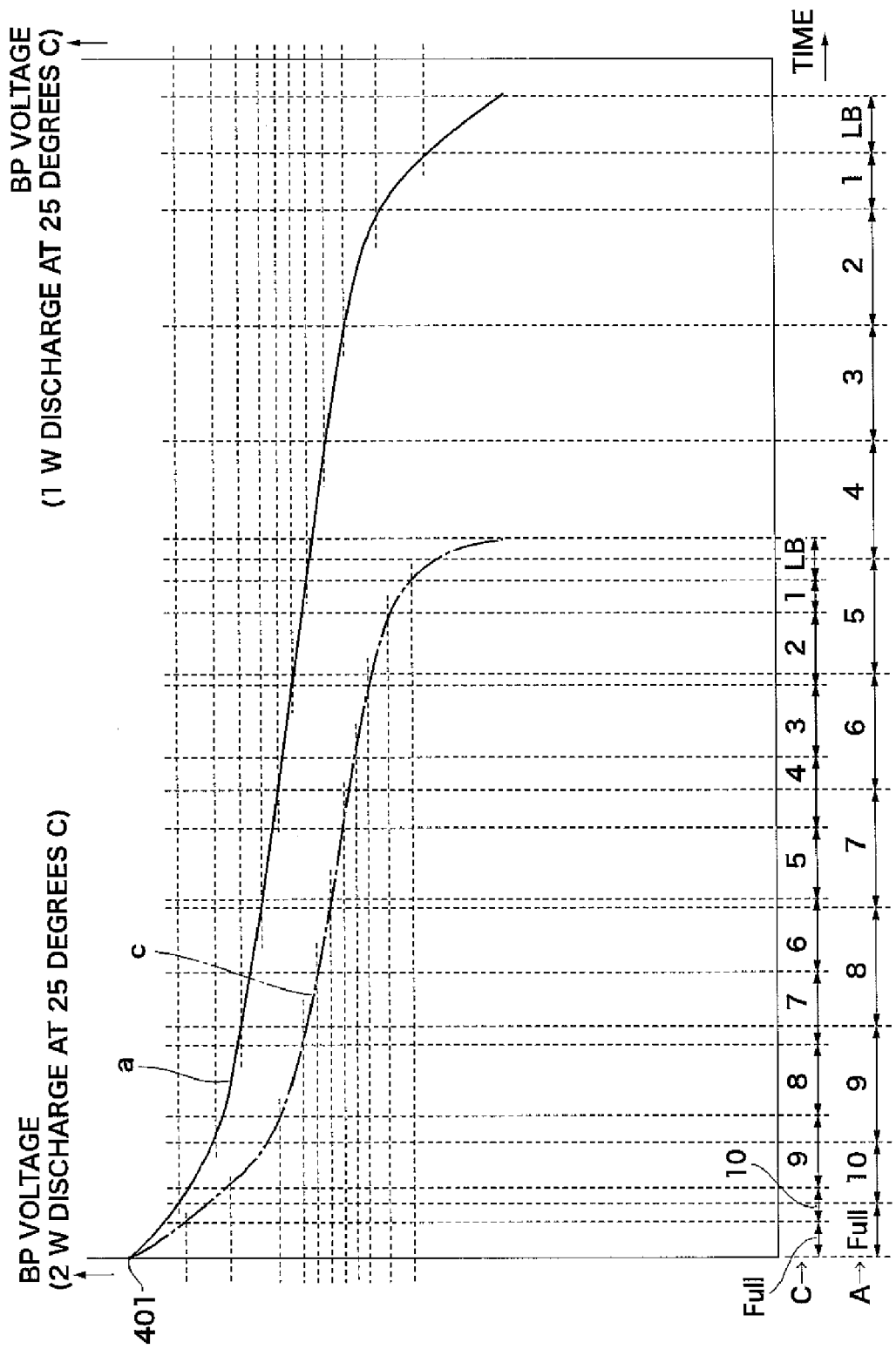
FIG. 35 is a view showing a relation between discharge load characteristic of the battery pack and first charge state data.

FIGS. 30 to 33B show examples of charge state data tables for use at discharging. FIG. 34 shows a relation between discharge characteristics of the battery pack 128 and the first charge state data. The illustrated discharge characteristics are battery (BP) voltages at charging at temperatures of 5 and 25 degrees Celsius. FIG. 35 shows a relation between discharge characteristic of the battery pack 128 and first charge state data.

In the charge state data table for use at discharging, first and second charge state data representing the charge state of the battery pack 128 and discharge characteristic data are made to correspond to each other.

The charge state data tables for use at discharging shown in FIGS. 30 to 32 indicate a relation between first charge state data at the time that the discharge output is 1 W, the full charge capacity is 700 [mAh], and the temperature at discharging is 25, 5, and 35 degrees Celsius, and the output voltage, the ratio relative to the full charge capacity, and the residual capacity. The charge state data tables for use at discharging are set differently between respective temperatures at discharging.

In each of the charge state data tables for use at discharging, the first charge state data is defined to represent twelve stages of the charge state of the battery pack 128, i.e., an LB state, first to tenth states, and a Full state thereof. For example, if the full charge capacity is 700 mAh, the charging temperature is 25 degrees Celsius, the discharge output is 1 W, the discharge temperature is 5 degrees Celsius, and the first charge state data is in the third state, it is determined that the output voltage (Vb) is in a range from 3.36 V (inclusive) to 3.44 V (exclusive), the full charge capacity ratio is in a range from 21% to 30%, and the residual capacity is in a range from 132.3 mAh to 189 mAh. Since the full charge capacity efficiency at charging at 25 degrees Celsius is represented by a value of "1" (see FIG. 36), and a correction value in the discharge temperature vs. load characteristic data table at 1 W discharge at 5 degrees Celsius is equal to a value of 0.9 (see FIG. 39), the residual capacity at a full charge capacity ratio of 100% is equal to 700×0.9=630 mAh. (In the case of charging at 5 degrees Celsius, the residual capacity is equal to 630×0.92=579.6 mAh).

In the charge state data tables for use at discharging, second charge state data is defined to divide each stage of first charge state data, as shown in FIGS. 33A and 33B. In the charge state data table for use at discharging and the charge state data table for use at charging, the first and second charge state data are coincident between at charging and at discharging. As in the charge state data table for use at charging shown in FIG. 15, in the charge state data table for use at discharging shown in FIGS. 33A and 33B, the second to ninth states of the first charge state data are each divided into ten stages, a combination of the first state and the LB state is divided into ten stages, and a combination of the tenth state and the Full state is divided into ten stages.

Referring to FIG. 34, there are shown discharge characteristics representing respective output voltage characteristics in the cases that the discharge load is at constant electric power of 1 W and the temperature at discharging is 5 and 25 degrees Celsius. Reference numeral 401 denotes an open voltage observed when the battery pack 128 is fully charged. An LB state voltage represents a lower limit voltage above which the electronic equipment 301 can normally operate.

In FIG. 34, symbol a denotes a curve representing a discharge characteristic of the battery pack 128 in the case that the temperature at discharging is 25 degrees Celsius and the discharge output is 1 W. Symbol b denotes a curve representing a discharge characteristic of the battery pack 128 in the case that the temperature at discharging is 5 degrees Celsius and the discharge output is 1 W. Symbol A denotes a charge state data table for use at discharging corresponding to the discharge characteristic curve a, and symbol B denotes a charge state data table for use at discharging corresponding to the discharge characteristic curve b. Since, as illustrated, the lower the temperature at discharging, the shorter the usable time period of the battery pack 128 becomes even at the same load (discharge output), a charge state range of the battery pack 128 is determined such as to correspond to the temperature at discharging.

Referring to FIG. 35, there are shown discharge characteristics indicating respective output voltage characteristics in the cases that the temperature at discharging is 25 degrees Celsius and the discharge load is a constant electric power of 1 W and 2 W. In FIG. 35, symbol a denotes a curve representing a discharge characteristic of the battery pack 129 in the case that the temperature at discharging is 25 degrees Celsius and the discharge output is 1 W. Symbol c denotes a curve representing a discharge characteristic of the battery pack 128 in the case that the temperature at discharging is 25 degrees Celsius and the discharge output is 2 W. Symbol A denotes a charge state data table for use at discharging corresponding to the discharge characteristic curve a, and symbol C denotes a charge state data table for use at discharging corresponding to the discharge characteristic curve c. Since, as illustrated, the greater the load (discharge output), the shorter the usable time period of the battery pack 128 becomes, a charge state range of the battery pack 128 is determined such as to correspond to the load.

Referring to FIG. 22 again, in step S208, the control microcomputer 308 reads out the first and second charge state data from the nonvolatile memory 133 of the battery pack 128 into the RAM of the control microcomputer 308. To read out the first and second charge state data, the data readout process shown in FIG. 6 is carried out.

In step S209, the control microcomputer 308 measures the output voltage Vb of the battery pack 128 by means of the resistors 311, 312. In step S210, the control microcomputer 308 measures the temperature of the battery pack 128 by means of the thermistor 134 of the battery pack 128 (battery pack temperature measurement process). At the time of temperature measurement, the battery pack temperature measurement process shown in FIG. 8 is carried out.

In steps S211 to S213, a self-discharge correction is carried out. The self-discharge refers to a natural reduction in charge capacity due to leakage current flowing through an internal resistance of the secondary battery cell 138 in the battery pack 128 or through the electronic equipment when the battery pack is left unused or left attached to the electronic equipment. If the self-discharge occurs in the battery pack 128, the charge capacity decreases. As a result, the charge state data stored in the nonvolatile memory 133 of the battery pack 128 becomes inconsistent with the current charge state data.

Thus, in the present embodiment, if the first charge state data determined from the output voltage Vb of the battery pack 128 is not consistent with the first charge state data stored in the nonvolatile memory 133, then the first charge state data stored in the nonvolatile memory 133 of the battery pack 128 is renewed, whereby proper charge state data can be maintained.

In step S211, a desired one of the charge state data tables for use at discharging for respective temperatures is referred to, and then the first and second charge state data corresponding to the output voltage Vb measured in step S209 are calculated. The charge state data table for use at discharging is stored in the ROM of the control microcomputer 308 or created in steps S205 to S207.

Next, in step S212, the control microcomputer 308 compares the first charge state data read out in step S208 with the first charge state data calculated in step S211, and determines whether or not these data are coincident with each other. As a result, if these first charge state data are coincident with each other, the flow proceeds to step S214. On the other hand, these data are not coincident with each other, the flow proceeds to step S213.

In step S213, the control microcomputer 308 writes the first and second charge state data calculated in step S211 into the data addresses of the first and second charge state data in the nonvolatile memory 133, thereby renewing the first and second charge state data in the nonvolatile memory 133. To write the charge state data into the nonvolatile memory 133, the data write process shown in FIG. 7 is carried out. Although relevant process is not illustrated, the self-discharge correction in steps S211 to S213 is carried out only once immediately after the battery pack is attached, and is not carried out thereafter. This is because priority is given to residual capacity calculation based on the amount of power consumption.

Next, in step S214, the control microcomputer 308 reads out full charge capacity data from the nonvolatile memory 133 of the battery pack 128. To read out the full charge capacity data, the data readout process shown in FIG. 6 is carried out.

In step S215, the control microcomputer 308 reads out temperature data at charging from the nonvolatile memory 133 of the battery pack 128. Next, in step S216 in FIG. 23, the microcomputer 308 reads out charge temperature characteristic data from the nonvolatile memory 133 of the battery pack 128. To read out the data in steps S215 and S216, the data readout process shown in FIG. 6 is carried out.

FIG. 36 shows an example of charge temperature characteristic data.

Referring to FIG. 36, the charge temperature characteristic data is for correcting a change in the full charge capacity of the battery pack 128 caused by a change in the temperature at charging. In this embodiment, the full charge capacity at charging at a temperature of 25 degrees Celsius is represented by a value of "1", the full charge capacity at charging at a temperature of 5 degrees Celsius is represented by a value of 0.92, and the full charge capacity at charging at a temperature of 35 degrees Celsius is represented by a value of 1.02.

Referring to FIG. 23 again, in step S217, the control microcomputer 308 calculates the residual capacity of the battery pack 129 based on full charge capacity data, temperature, temperature data at charging, charge temperature characteristic data, and first and second charge state data (residual capacity calculation process).

Figure 25:
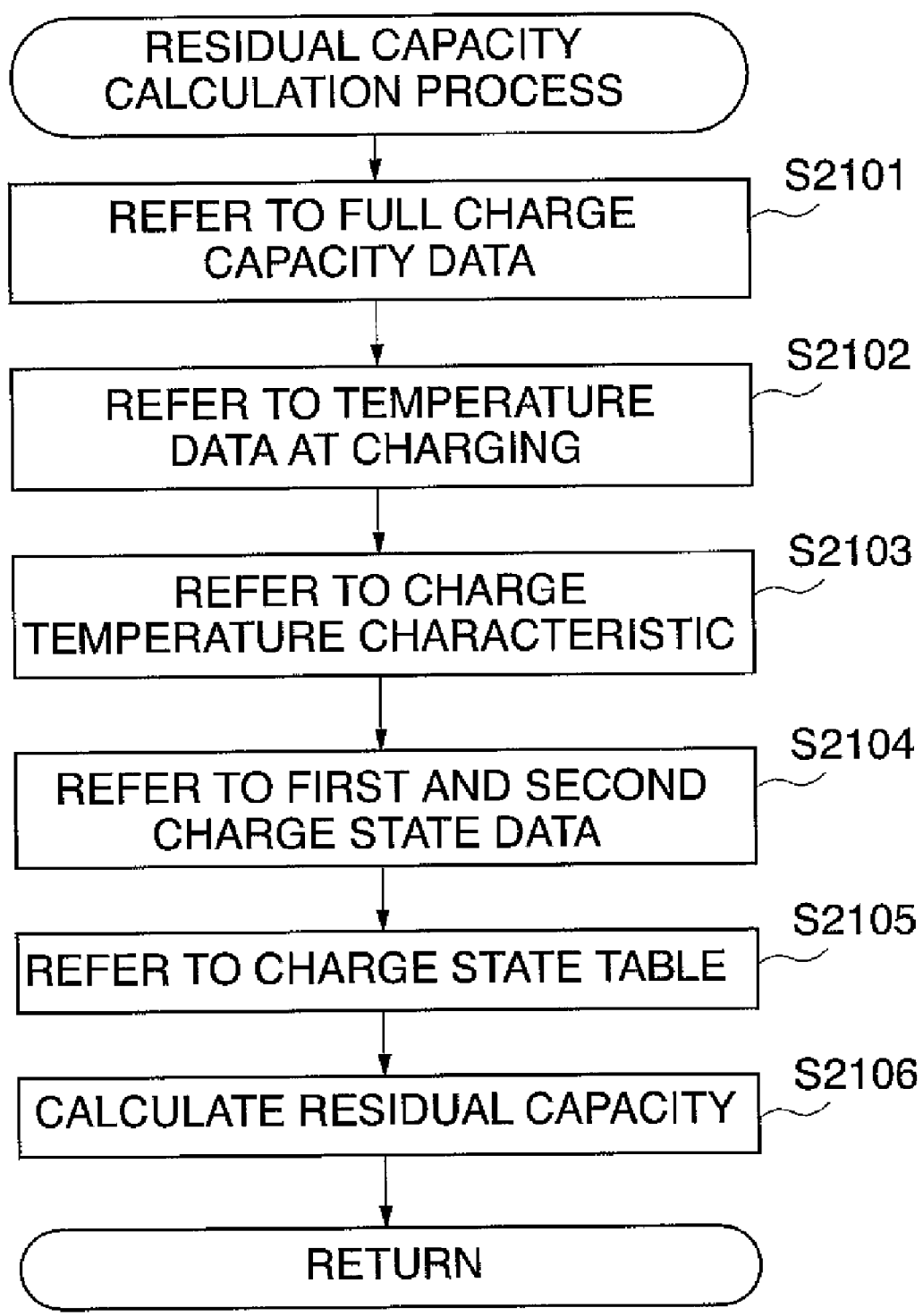
FIG. 25 is a flowchart showing in detail a residual capacity calculation process shown in FIG. 23.

FIG. 25 shows in flowchart the details of the residual capacity calculation process at step S217 in FIG. 23.

In step S2101 of FIG. 25, the control microcomputer 308 refers to the full charge capacity data read out in step S214. Next, in step S2102, the temperature data at charging read out in step S215 is referred to. In step S2103, the charge temperature characteristic data read out in step S216 is referred to.

Next, in step S2104, the control microcomputer 308 refers to first and second charge state data stored in the nonvolatile memory 133 of the battery pack 128. In step S2105, the charge state data table for use at discharging is referred to.

In the next step S2106, the control microcomputer 308 specifies full charge capacity efficiency corresponding to the temperature data at charging from the charge temperature characteristic data, and the full charge capacity data is multiplied by the full charge capacity efficiency, thereby correcting the full charge capacity data. Then, based on the first and second charge state data, the residual capacity of the battery pack 128 is calculated from the charge state data table for use at discharging that corresponds to the temperature at discharging. Whereupon, the process returns to the main flow.

Referring to FIG. 23 again, in step S218, the control microcomputer 308 calculates a continuously usable time of the battery pack 128 (continuously usable time calculation process).

Figure 26:
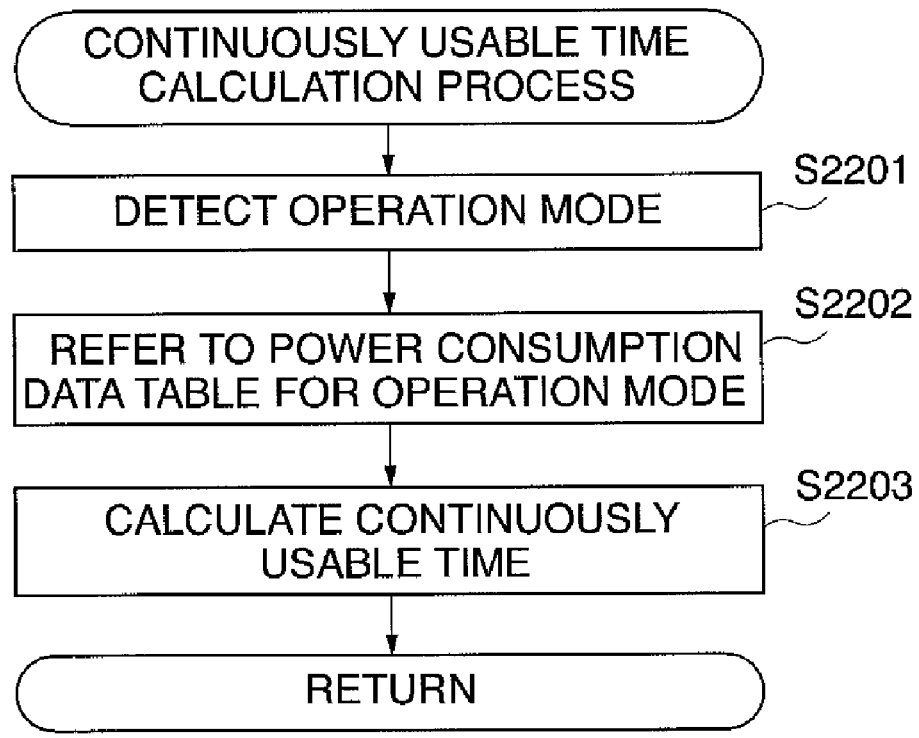
FIG. 26 is a flowchart showing in detail a continuously usable time calculation process shown in FIG. 23.

FIG. 26 shows in flowchart the details of the continuously usable time calculation process at step S218 in FIG. 23.

In step S2201 of FIG. 26, the control microcomputer 308 detects an operation mode set in the electronic equipment 301. In step S2202, a power consumption data table stored in the ROM of the control microcomputer 308 is referred to, and power consumption corresponding to the operation mode detected in step S2201 is calculated. An example of the power consumption data table is shown in FIG. 37. In the power consumption data table, power consumption per unit time is defined for each operation mode of the electronic equipment 301.

Next, in step S2203, the residual capacity of the battery pack 128 calculated in step S217 is divided by the power consumption calculated in step S2202 to thereby calculate a continuously usable time in the operation mode, whereupon the process returns to the main flow.

Referring to FIG. 23 again, in step S219, the control microcomputer 308 calculates an actual usable time from the continuously usable time calculated in step S218 (actual usable time calculation process).

Figure 27:
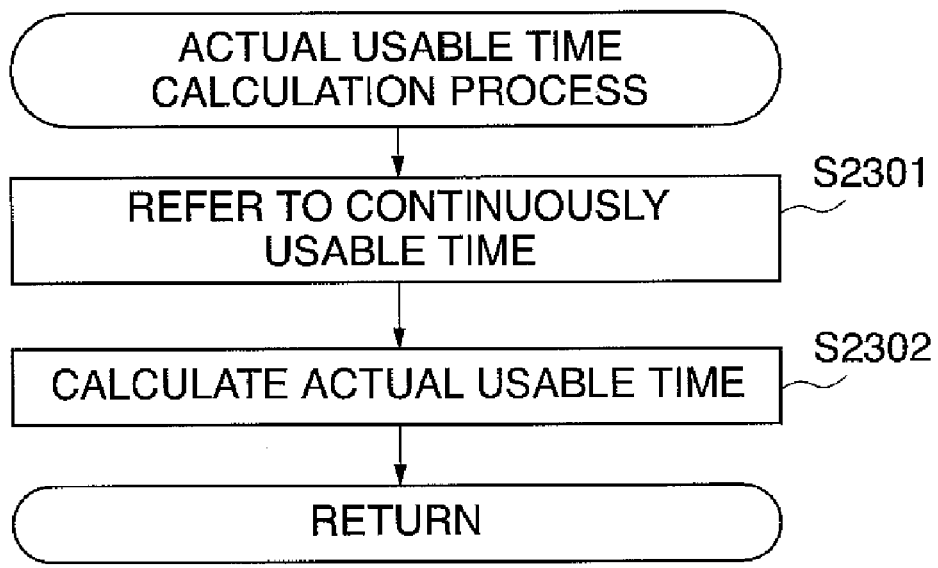
FIG. 27 is a flowchart showing in detail an actual usable time calculation process shown in FIG. 23.

FIG. 27 shows in flowchart the details of the actual usable time calculation process at step S219 in FIG. 23.

In step S2301 of FIG. 27, the continuously usable time calculated in step S218 is referred to. Next, in step S2302, an appropriate actual usable time coefficient is selected from an actual usable time coefficient data table stored beforehand in the ROM of the control microcomputer 308, and the continuously usable time is multiplied by the selected actual usable time coefficient to thereby calculate an actual usable time. Whereupon the process returns to the main flow.

Actual usable time coefficients are constants representing amounts of power consumption at the time of shooting standby, zooming operation, and other usual operations in the shooting mode. An example of the actual usable time coefficient data table stored in the ROM of the control microcomputer 308 is shown in FIG. 38. In the actual usable time coefficient data table, actual usable time coefficients for respective operation modes are defined.

Referring to FIG. 23 again, in step S220, the control microcomputer 308 performs control to cause the continuously usable time calculated in step S218 and the actual usable time calculated in step S219 to be displayed on the display unit 313 of the electronic equipment 301.

In step S221 of FIG. 23, the control microcomputer 308 starts an operation corresponding to the operation mode set in the electronic equipment 301. Since the electronic equipment 301 is a digital camera in this embodiment, a shooting operation is started if the operation mode is a shooting mode. If the operation mode is a playback mode, a playback operation is started. Next, in step S222, a value of "0" is written into a data address of the charge history data stored in the nonvolatile memory 133 of the battery pack 128. To write the charge history data, the data write process shown in FIG. 7 is carried out.

In steps S224 to S226, the control microcomputer 308 uses a timer to measure a period of time of operation in the operation mode started in step S211. The timer is incorporated in the control microcomputer 308.

Next, in step S227, the control microcomputer 308 calculates a power consumption amount (power consumption amount calculation process).

Figure 28:
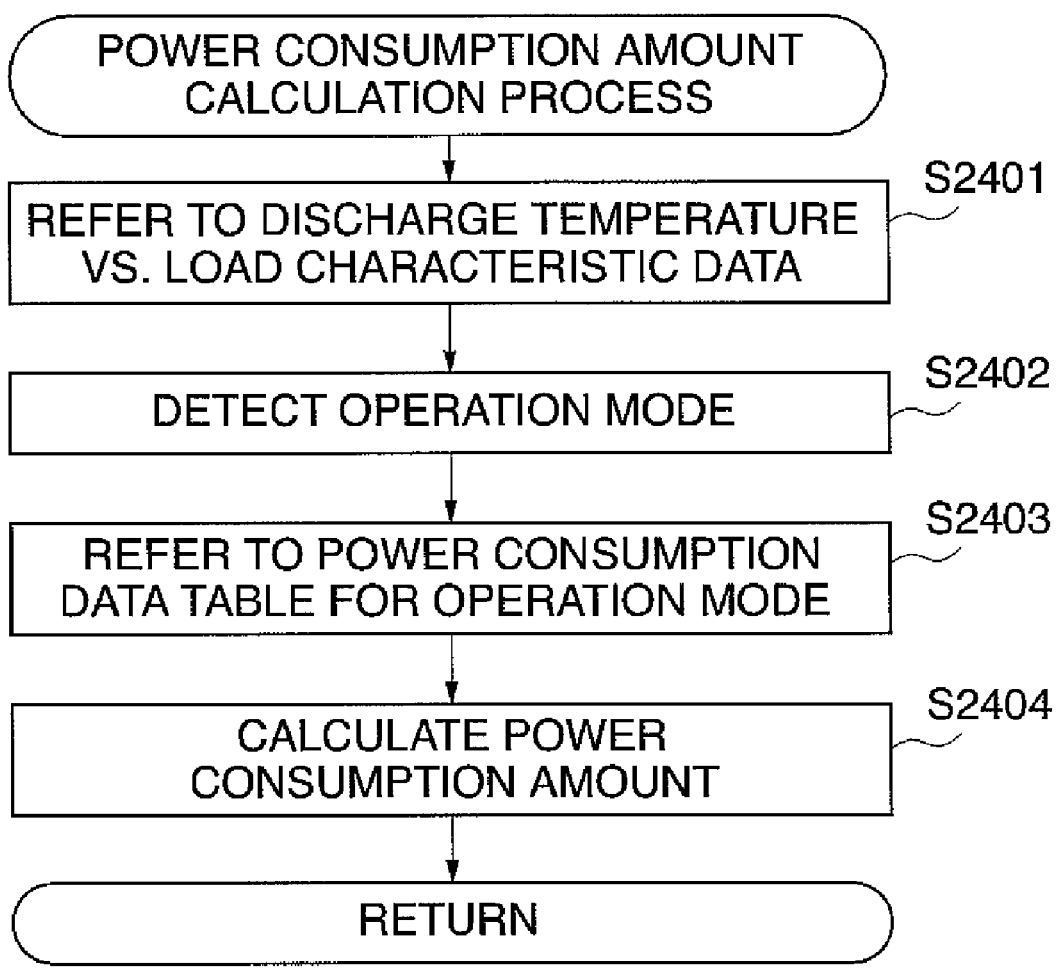
FIG. 28 is a flowchart showing in detail a power consumption amount calculation process shown in FIG. 24.

FIG. 28 shows in flowchart the details of the power consumption amount calculation process at step S227 in FIG. 24.

In step S2401 of FIG. 28, the control microcomputer 308 refers to a discharge temperature vs. load characteristic data table stored in the nonvolatile memory 133 of the battery pack 128. As shown in FIG. 39, the discharge temperature vs. load characteristic data table is a correction table for use in correcting the power consumption amount in accordance with the temperature at discharging.

Next, in step S2402, the control microcomputer 308 detects the current operation mode of the electronic equipment 301. In step S2403, the power consumption data table shown in FIG. 37 and stored in the ROM of the control microcomputer 308 is referred to, and power consumption corresponding to the operation mode detected in step S2402 is specified. In step S2404, the power consumption specified in step S2403 is multiplied by the operation time period measured in steps S224 to S226, thereby calculating the power consumption amount in the operation mode. Then, based on the discharge temperature vs. load characteristic data table referred to in step S2401, the power consumption amount is corrected, whereupon the process proceeds to the main flow.

Referring to FIG. 24 again, in step S228, a charge state data calculation process is carried out.

Figure 29:
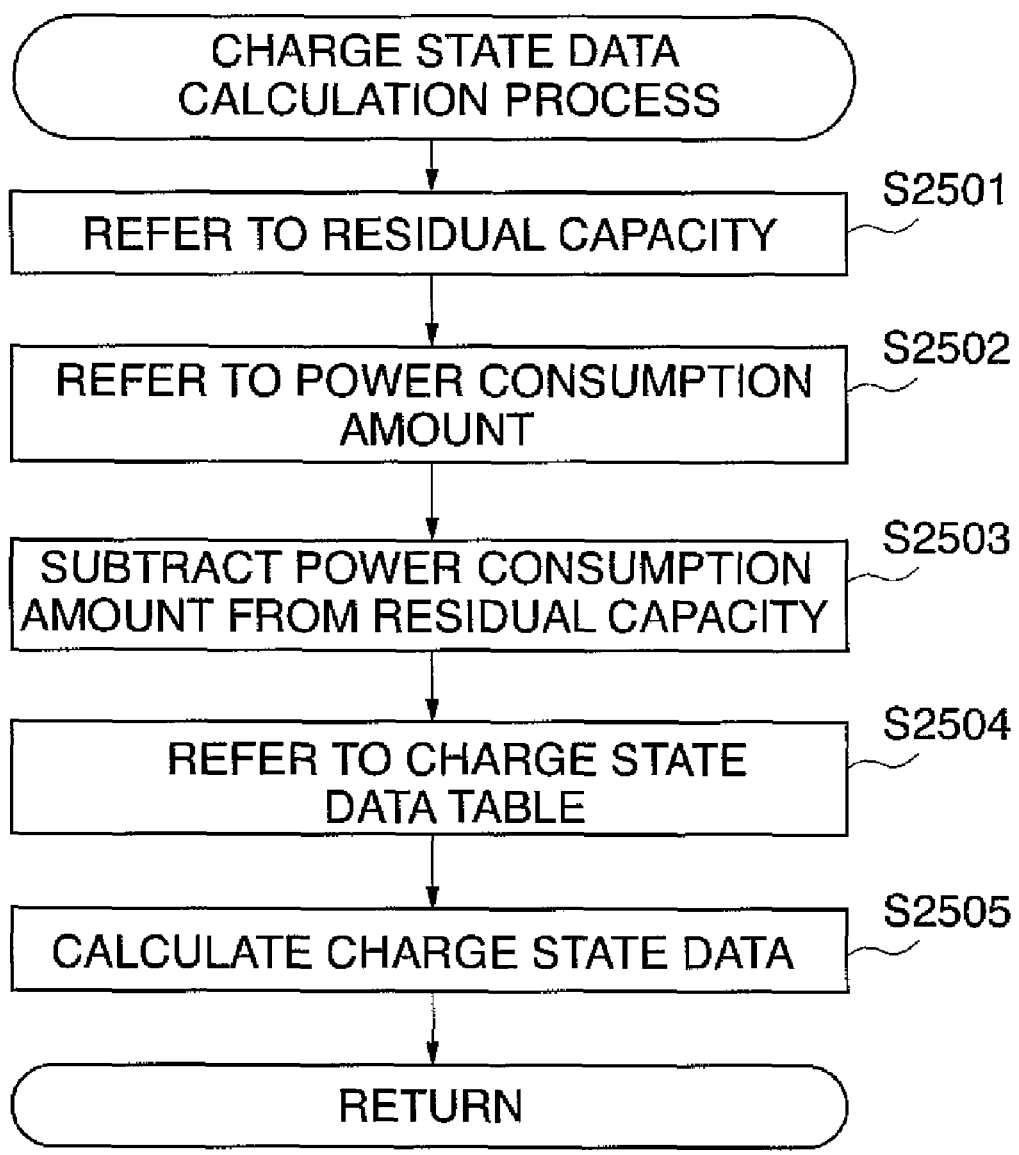
FIG. 29 is a flowchart showing in detail a charge state data calculation process shown in FIG. 24.

FIG. 29 shows in flowchart the details of the charge state data calculation process at step S228 in FIG. 24.

In step S2501 of FIG. 29, the residual capacity calculated in step S217 is referred to. In step S2502, the power consumption amount calculated in step S227 is referred to. In step S2503, the power consumption amount is subtracted from the residual capacity, thereby calculating the residual capacity of the battery pack 128 after completion of the operation mode. In step S2504, the charge state data table for use at discharging corresponding to the temperature measured in step S210 is referred to. In step S2505, based on the residual capacity calculated in step S2503, first and second charge state data after completion of the operation mode are calculated from the charge state data table for use at discharging referred to step S2504, whereupon the process returns to the main flow.

Referring to FIG. 24 again, in step S229, the control microcomputer 308 compares the first and second charge state data in the nonvolatile memory 133 with first and second charge state data calculated in step S228, and determines whether or not the charge state data should be rewritten. As a result of the data comparison, if it is determined that both the charge state data coincide with each other, the control microcomputer 308 determines that rewriting the charge state is not required, and the process proceeds to step S208. On the other hand, if both the charge state data do not coincide with each other, the control microcomputer 308 determines that the charge state data should be rewritten, and the flow proceeds to step S230.

In step S230, the control microcomputer 308 writes the first and second charge state data calculated in step S228 into data address of first and second charge state data in the nonvolatile memory 133 of the battery pack 128. To write the charge state data, the data write process shown in FIG. 7 is carried out.

In step S231, the control microcomputer 308 detects whether or not the battery pack 128 has been detached from the electronic equipment 301. When it is determined that the battery pack 128 has been detached from the electronic equipment 301, the operation process is completed. On the other hand, if the battery pack 128 has not been detached, the flow proceeds to step S208. In the detection of detachment, it is determined that the battery pack 128 has been detached when the temperature (T) terminal 304 on the electronic equipment side is made open.

According to the above described embodiment, the charge state of the battery pack 128 when the battery pack 128 is charged by the battery charger 101 can be managed with accuracy. In addition, the residual capacity of the battery pack 128 in the electronic equipment 301 can accurately be managed, whereby a more accurate residual capacity indication can be carried out. Furthermore, the temperature characteristics at charging and at discharging can be reflected to the indication of residual capacity of the battery pack 128, making it possible to improve the accuracy of the residual capacity indication. Moreover, without an element for current value measurement being provided in a power supply line, the residual capacity indication can be performed which is compact in size, low in cost, and excellent in electric power efficiency.

In the above described embodiment, the example has been described in which temperature ranges at charging and discharging are each divided into three for management. However, the temperature ranges can be divided more finely for storage of data of respective temperature ranges. In a case that the memory capacity is limited, the charge and discharge characteristic data for each temperature range may be calculated by means of interpolation, and the charge state data tables for use at charging and at discharging may be created therefrom, whereby the residual capacity state can be managed more accurately.

In the above described embodiment, the electronic equipment 301 is not limited to a digital camera or a digital video camera, and may be some other information terminal such as a cellular phone, a note-book personal computer, and a PDA.

The provision of the thermistor 134 in the battery pack 128 is not inevitably necessary so long as the temperature measurement can be carried out.

In the above described embodiment, the battery pack 128 is provided with the thermistor 134 which is a temperature measurement element. However, the thermistor 134 may be omitted. In that case, step S112 in FIG. 3 is omitted. Thus, only the charge state data tables for use at charging at a normal temperature are stored in the ROM of the charge control microcomputer 118.

It is to be understood that the present invention may also be accomplished by supplying a system or an apparatus with a storage medium in which a program code of software, which realizes the functions of the above described embodiment is stored and by causing a computer (or CPU or MPU) of the system or apparatus to read out and execute the program code stored in the storage medium. In that case, the program code itself read from the storage medium realizes the functions of the above described embodiment, and therefore the program code and the storage medium in which the program code is stored constitute the present invention.

Examples of the storage medium for supplying the program code include a floppy (registered trademark) disk, a hard disk, and a magnetic-optical disk, an optical disk such as a CD-ROM, a CD-R, a CD-RW, a DVD-ROM, a DVD-RAM, a DVD-RW, a DVD+RW, a magnetic tape, a nonvolatile memory card, and a ROM. The program code may be downloaded via a network.

Further, it is to be understood that the functions of the above described embodiment may be accomplished not only by executing the program code read out by a computer, but also by causing an OS (operating system) or the like which operates on the computer to perform a part or all of the actual operations based on instructions of the program code.

Further, it is to be understood that the functions of the above described embodiment may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

While the present invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2007-137098 filed May 23, 2007, which is hereby incorporated by reference herein in its entirety.

What is claimed is:

1. A charging apparatus, comprising:
   a first terminal that is used to communicate with a battery apparatus, the battery apparatus including a memory that stores charge state data;
   a counting unit adapted to count a number of times the charge state data stored in the memory of the battery apparatus has been rewritten;
   a charge cycle calculating unit adapted to calculate a number of charge cycles based on the counted number of times the charge state data stored in the memory of the battery apparatus has been rewritten; and
   a control unit that (a) determines charge state data based on a temperature of the battery apparatus, a charge voltage, and a charge current, the determined charge state data representing a charge state of the battery apparatus, (b) corrects full charge capacity data based on the calculated number of charge cycles if the determined charge state data exceeds the charge state data stored in the memory of the battery apparatus and the calculated number of charge cycles is not less than one cycle, and (c) stores the corrected full charge capacity data in the memory of the battery apparatus.

2. A non-transitory computer readable storage medium that stores a program for causing a computer to act as the charging apparatus according to claim 1.

3. The charging apparatus according to claim 1, wherein the battery apparatus is configured to connect to the charging apparatus.

4. The charging apparatus according to claim 1, further comprising a second terminal that is used to detect the temperature of the battery apparatus.

5. The charging apparatus according to claim 1, wherein the control unit stores the determined charge state data in the memory of the battery apparatus to rewrite the charge state data stored in the memory of the battery apparatus if the determined charge state data exceeds the charge state data stored in the memory of the battery apparatus.

6. The charging apparatus according to claim 1, further comprising:
a display unit that displays the charge state of the battery apparatus.

7. The charging apparatus according to claim 1, wherein the control unit does not perform a determination of whether or not the calculated number of charge cycles is less than one cycle if the determined charge state data does not exceed the charge state data stored in the memory of the battery apparatus.

8. A method of controlling a charging apparatus including (a) a first terminal that is used to communicate with a battery apparatus, the battery apparatus including a memory that stores charge state data, (b) a counting unit adapted to count a number of times the charge state data stored in the memory of the battery apparatus has been rewritten, and (c) a charge cycle calculating unit adapted to calculate a number of charge cycles based on the counted number of times the charge state data stored in the memory of the battery apparatus has been rewritten, the method comprising the steps of:
determining charge state data based on a temperature of the battery apparatus, a charge voltage, and a charge current, the determined charge state data representing a charge state of the battery apparatus;
controlling the charging apparatus to correct full charge capacity data based on the calculated number of charge cycles if the determined charge state data exceeds the charge state data stored in the memory of the battery apparatus and the calculated number of charge cycles is not less than one cycle; and
controlling the charging apparatus to store the corrected full charge capacity data in the memory of the battery apparatus.

9. The method according to claim 8, wherein the battery apparatus is configured to connect to the charging apparatus.

10. The method according to claim 8, wherein the charging apparatus includes a second terminal that is used to detect the temperature of the battery apparatus.

11. The method according to claim 8, further comprising:
controlling the charging apparatus to store the determined charge state data in the memory of the battery apparatus to rewrite the charge state data stored in the memory of the battery apparatus if the determined charge state data exceeds the charge state data stored in the memory of the battery apparatus.

12. The method according to claim 8, wherein the charging apparatus includes a display unit that displays the charge state of the battery apparatus.

13. The method according to claim 8, further comprising:
controlling the charging apparatus not to perform a determination of whether or not the calculated number of charge cycles is less than one cycle if the determined charge state does not exceed the charge state data stored in the memory of the battery apparatus.

14. A non-transitory computer readable storage medium that stores a program for causing a computer to execute a method of controlling a charging apparatus including (a) a first terminal that is used to communicate with a battery apparatus, the battery apparatus including a memory that stores charge state data, (b) a counting unit adapted to count a number of times the charge state data stored in the memory of the battery apparatus has been rewritten, and (c) a charge cycle calculating unit adapted to calculate a number of charge cycles based on the counted number of times the charge state data stored in the memory of the battery apparatus has been rewritten, the method comprising the steps of:
determining charge state data based on a temperature of the battery apparatus, a charge voltage, and a charge current, the determined charge state data representing a charge state of the battery apparatus;
controlling the charging apparatus to correct full charge capacity data based on the calculated number of charge cycles if the determined charge state data exceeds the charge state data stored in the memory of the battery apparatus and the calculated number of charge cycles is not less than one cycle; and
controlling the charging apparatus to store the corrected full charge capacity data in the memory of the battery apparatus.

\* \* \* \* \*